(12) United States Patent
Khoury et al.

(10) Patent No.: US 7,623,508 B2
(45) Date of Patent: Nov. 24, 2009

(54) BANDWIDTH ON DEMAND FOR MEDIA SERVICES AT STATIONARY EQUIPMENT UNIT

(75) Inventors: David J. Khoury, Stockholm (SE); Andrew J. Sharp, Lindingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 828 days.

(21) Appl. No.: 10/823,764

(22) Filed: Apr. 14, 2004

(65) Prior Publication Data

US 2004/0218586 A1   Nov. 4, 2004

Related U.S. Application Data

(60) Provisional application No. 60/462,703, filed on Apr. 15, 2003.

(51) Int. Cl.
*H04L 12/66* (2006.01)
(52) U.S. Cl. .................. 370/352; 370/401; 370/468
(58) Field of Classification Search .............. 370/216, 370/248, 351, 352, 468, 254, 431
See application file for complete search history.

(56) References Cited

U.S. PATENT DOCUMENTS

| | | | |
|---|---|---|---|
| 2002/0062379 A1 | 5/2002 | Widegren et al. | |
| 2002/0103009 A1* | 8/2002 | Sato | 455/558 |
| 2002/0165966 A1 | 11/2002 | Widegren et al. | |
| 2002/0177446 A1* | 11/2002 | Bugeja et al. | 455/450 |

FOREIGN PATENT DOCUMENTS

WO    03/003767 A1    1/2003

OTHER PUBLICATIONS

International Search Report mailed Jul. 12, 2004 in corresponding PCT application No. PCT/SE2004/000582.
Written Opinion mailed Jul. 12, 2004 in corresponding PCT application No. PCT/SE2004/000582.
Technical Spec. 3GPP TS 25.302 V4.5.0, $3^{rd}$ Generation Partnership Project: Technical Spec. Group Radio Access Network; Services Provided by the Physical Layer (Release 4), Jun. 2002.
Technical Spec. 3GPP TS 25.301 V4.3.0, $3^{rd}$ Generation Partnership Project: Technical Spec. Group Radio Access Network; Radio Interface Protocol Architecture (Release 4), Jun. 2002.

* cited by examiner

*Primary Examiner*—Hong Cho
*Assistant Examiner*—Robert C Scheibel
(74) *Attorney, Agent, or Firm*—Nixon & Vanderhye, P.C.

(57) ABSTRACT

A node (26) of a communications network (20) establishes multiple simultaneous access bearers (38) to a stationary equipment unit (22) which is connected to the node (26) by a essentially fixed location physical link (24). Advantageously, the multiple simultaneous access bearers can have different bandwidths and quality of service capabilities. For example, the node can establish access bearers for providing different types of services to the stationary equipment unit, the different types of services including one of a voice service, a video service, and a data traffic service. Moreover, the multiple simultaneous access bearers include both circuit switched access bearers and packet switched access bearers.

29 Claims, 13 Drawing Sheets

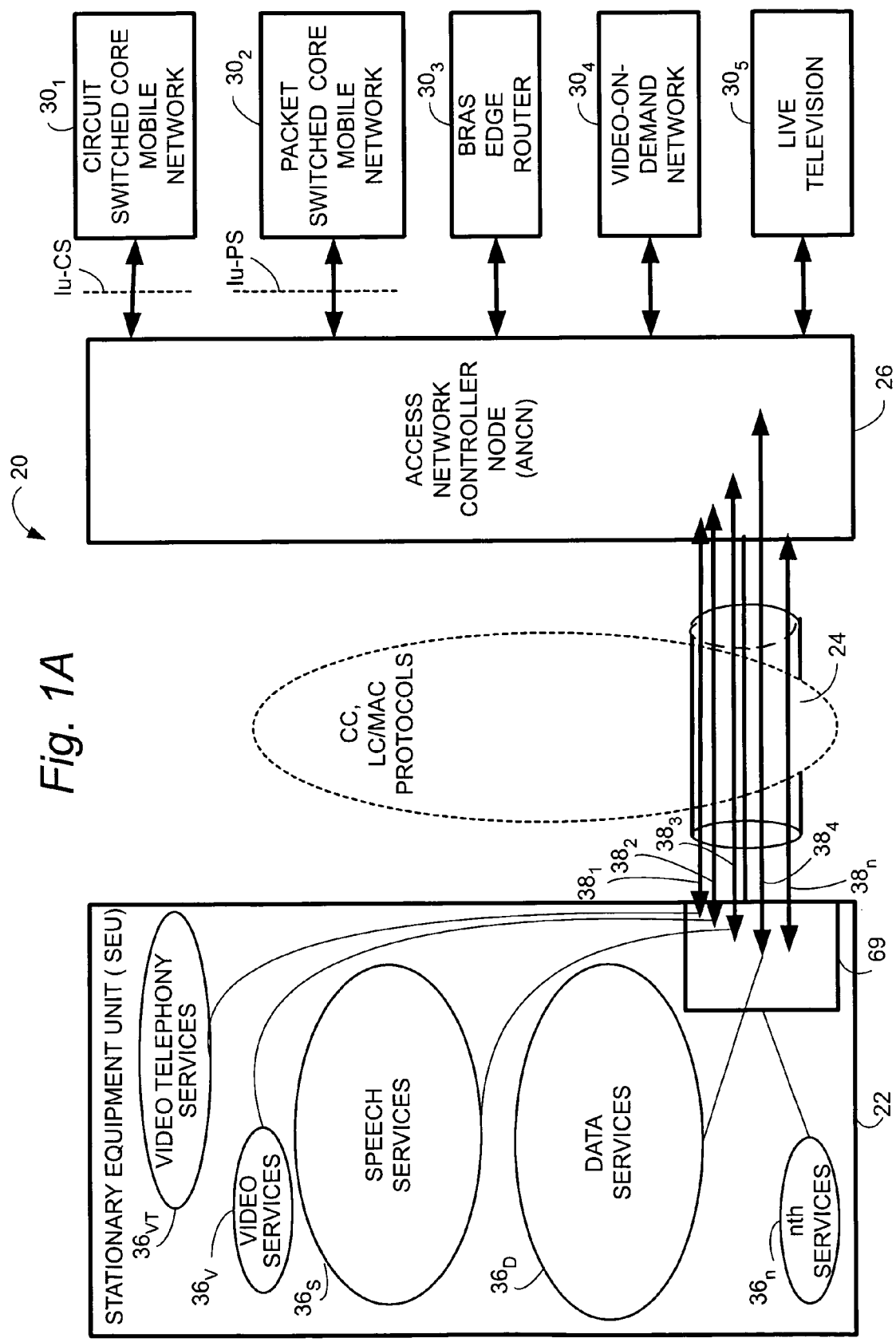

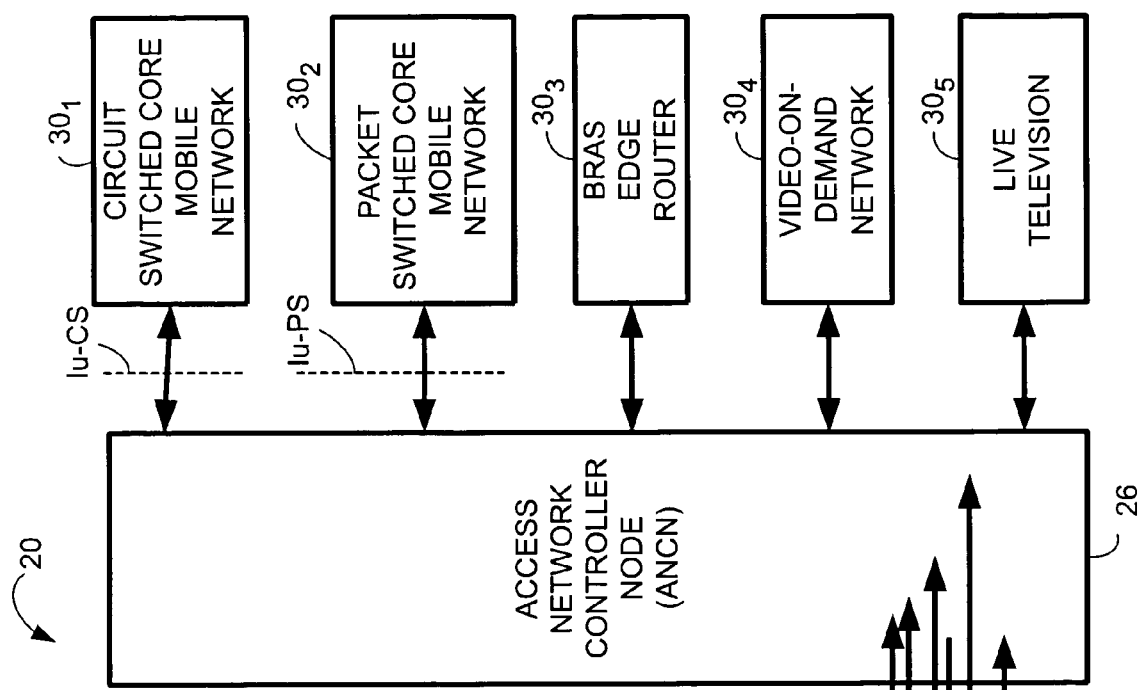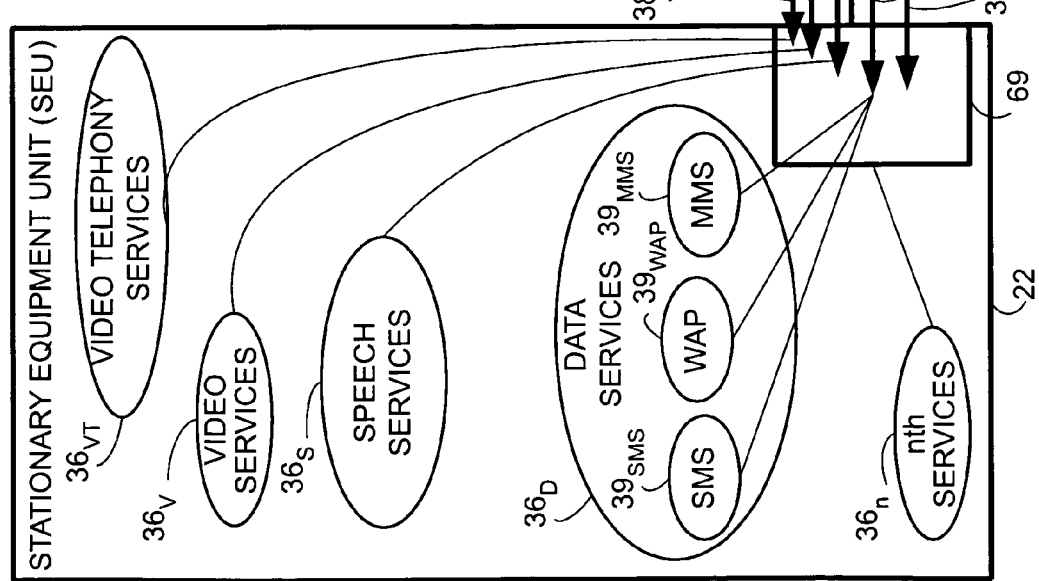
Fig. 1B

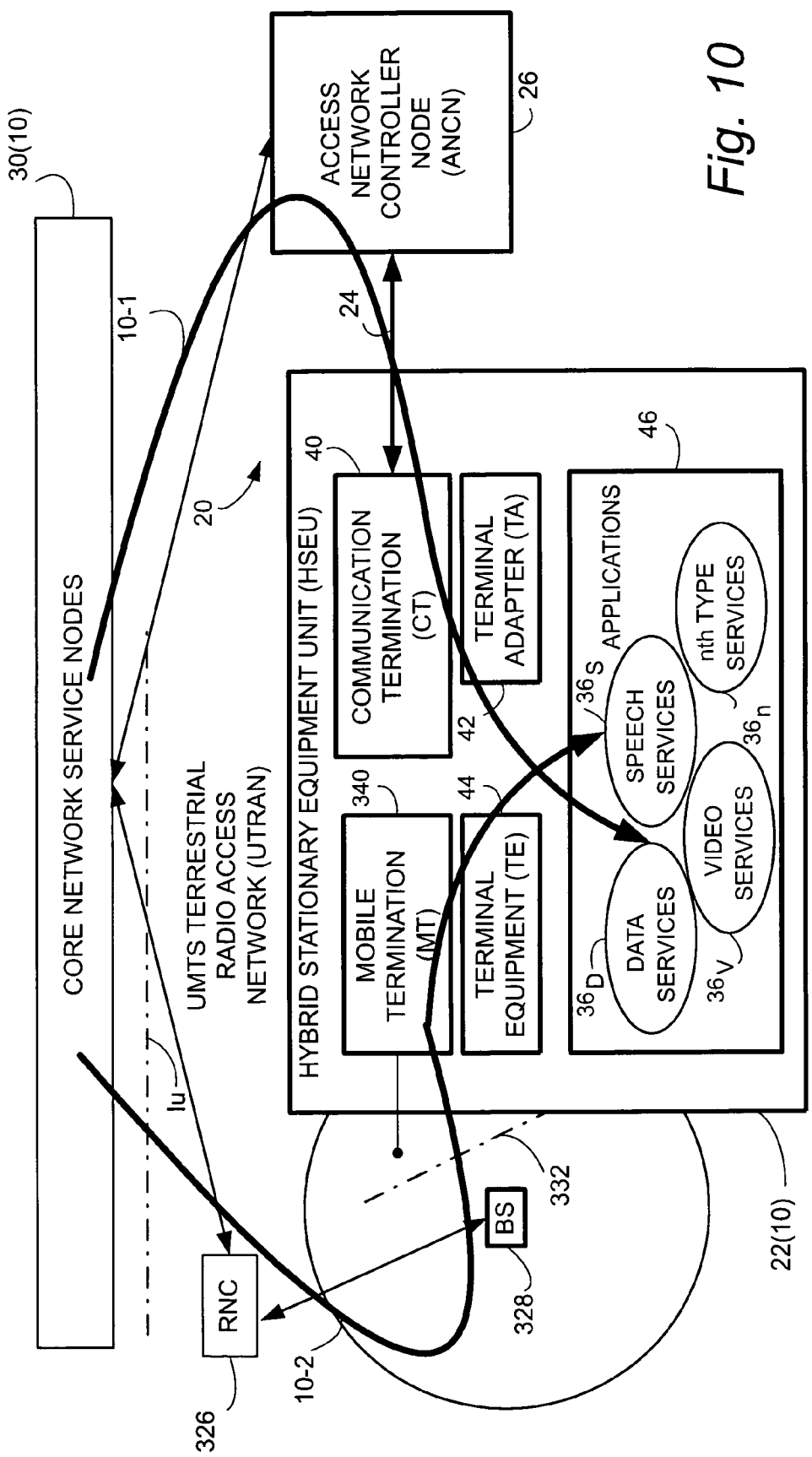

BANDWIDTH ON DEMAND FOR MEDIA SERVICES AT STATIONARY EQUIPMENT UNIT

This application claims the benefit and priority of U.S. Provisional Patent Application 60/462,703, filed Apr. 15, 2003, which is incorporated by referenced herein in its entirety.

BACKGROUND

1. Field of the Invention

The present invention pertains to the provision of telecommunication and/or media services to a fixed location device or stationary equipment unit.

2. Related Art and Other Considerations

Voice services, video services, and data traffic services are examples of general types of media services which are prevalent in information technology. Access to such services, at a home or a residence for example, can be provided using any one of several access technologies, such as telephony (e.g., via PSTN), public radio (via radio frequencies), Internet (via modem connection over PSTN or via Ethernet cable connection), and television channels (e.g., over cable or satellite).

Often there is a need, when using an essentially stationary user equipment device, to obtain access to media services from a fixed location, such as a home. In such case the stationary device is typically connected by a wire-line to a fixed access network. Yet for such a device thus far there is no access solution that can provide a mix of both circuit switched access bearers and packet switched access bearers, nor the dynamic establishment of these access bearers on a same physical media access in the wire-line/fixed access network. Moreover, currently there is no node/system which, for such non-airlink-connected equipment, can establish/release dynamically the bearer channels, or switch the circuit switched access bearer channels and the packet switched access bearer channels with different bit rates and quality of service (QoS) in the same node and independently of the transport layer technology. In other words, it is not now possible to have bandwidth on demand for different media services (voice, video and data traffic services) on the same physical access links and controlled by one node and independently of the transport layer technology.

The problem in the existing wire-line/fixed network is that each service requires its own network and equipment. Each media type requires its own network and its own access network, with network-specific switches and specific access termination equipment.

What is needed, therefore, and an object of the present invention, are apparatus and technique for providing services of differing characteristics (e.g., different bandwidth, different quality of service, different bit rate) to an essentially stationary user equipment device.

An advantage of another aspect of the present invention is provision of dynamic access bearer handling/dynamic bandwidth allocation of various services on one physical channel/wire of fixed network.

An advantage of another aspect of the present invention is provision of service availability for popular services at both a mobile user equipment unit and a stationary equipment unit.

BRIEF SUMMARY

An access network controller node (ANCN) of a communications network establishes multiple access bearers to a fixed or stationary equipment unit which is connected to the access network controller node (ANCN) by an essentially fixed location physical link. The access node is connected to one or more external networks (e.g., service provider networks).

In one example, non-limiting embodiment, the network controller node comprises a port (by which the access network controller node is connectable by the fixed location physical link to the stationary equipment unit); a connection control unit; and, a bearer service processing unit. The connection control unit establishes access bearers for providing services to the stationary equipment unit. The bearer service processing unit maps multiple access bearers into packets of a transport protocol of the fixed location physical link.

The multiple access bearers are capable of simultaneous utilization. Advantageously, the multiple access bearers can have different bandwidths and quality of service capabilities. Accordingly, each access bearer may be associated with or usable by a different type of media services. The multiple access bearers possibly include both circuit switched access bearers and packet switched access bearers. For example, the node can establish access bearers for providing different types of services to the stationary equipment unit, the different types of services including (for example) one of a voice service, a video service, and a data traffic service. The access bearers for different types of services may be employed concurrently. Moreover, an access bearer can carry one or more services of the same service type.

The fixed location physical link which connects the access network controller node to the stationary equipment unit can be any wired link or electromagnetic physical medium link which presumes that the locations of the link endpoints are essentially fixed (e.g., an optical link, a radio link which does not require mobility management). The link is said to be an essentially fixed location physical link since there may be some tolerance in the location of the ordinarily stationary equipment unit permitted by, e.g., a wire or cable having a length permitting adjustable repositioning of the stationary equipment unit or an electromagnetic beam having a pattern permitting a comparable repositioning of the stationary equipment unit (without the repositioning having to be taken into consideration in the information encoded in the electromagnetic beam or the network providing the media services). The packets of the transport protocol can be (for example) Internet Transport Protocol (IP) packets or Asynchronous Transfer Mode (ATM) packets.

The types of external networks to which the access network controller node can be connected include core networks and various types of service provider networks. For example, the external networks can be a core mobile circuit switched network and/or a core mobile packet switched network, thereby rendering it possible to provide to the stationary equipment unit (SEU) essentially the same types of access bearers and services as are provided to a WCDMA user equipment unit (e.g., handset). The service provider networks may also include networks which provide such services as video on demand, or live television, for example.

Also disclosed is a method of operating a communications network. The method involves connecting a stationary equipment unit to an access network controller node by a fixed location physical link; establishing multiple access bearers for providing services to the stationary equipment unit; and mapping the multiple access bearers into packets of a transport protocol of the fixed location physical link.

Also disclosed is an equipment unit which is connected by the fixed location physical link to the access network controller node, and which uses multiple access bearers for communicating with the access network interface node when participating in different types of services. In particular, the stationary equipment unit includes means for forming a physical connection to a network by a fixed location physical link; means for executing plural media services; and, a protocol stack which, for the plural media services, utilizes multiple simultaneous access bearers which are mapped into packets of a transport protocol of the fixed location physical link. Differing ones of the multiple access bearers are configured for utilization by differing types of media services.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a diagrammatic view of an example media access network with a first set of access bearers.

FIG. 1B is a diagrammatic view of an example media access network wherein plural services are transported over the same access bearer.

FIG. 10 is a schematic view showing provision of media services across both a radio interface and a non-radio physical interface to a single stationary equipment unit.

DETAILED DESCRIPTION

Figure 2:
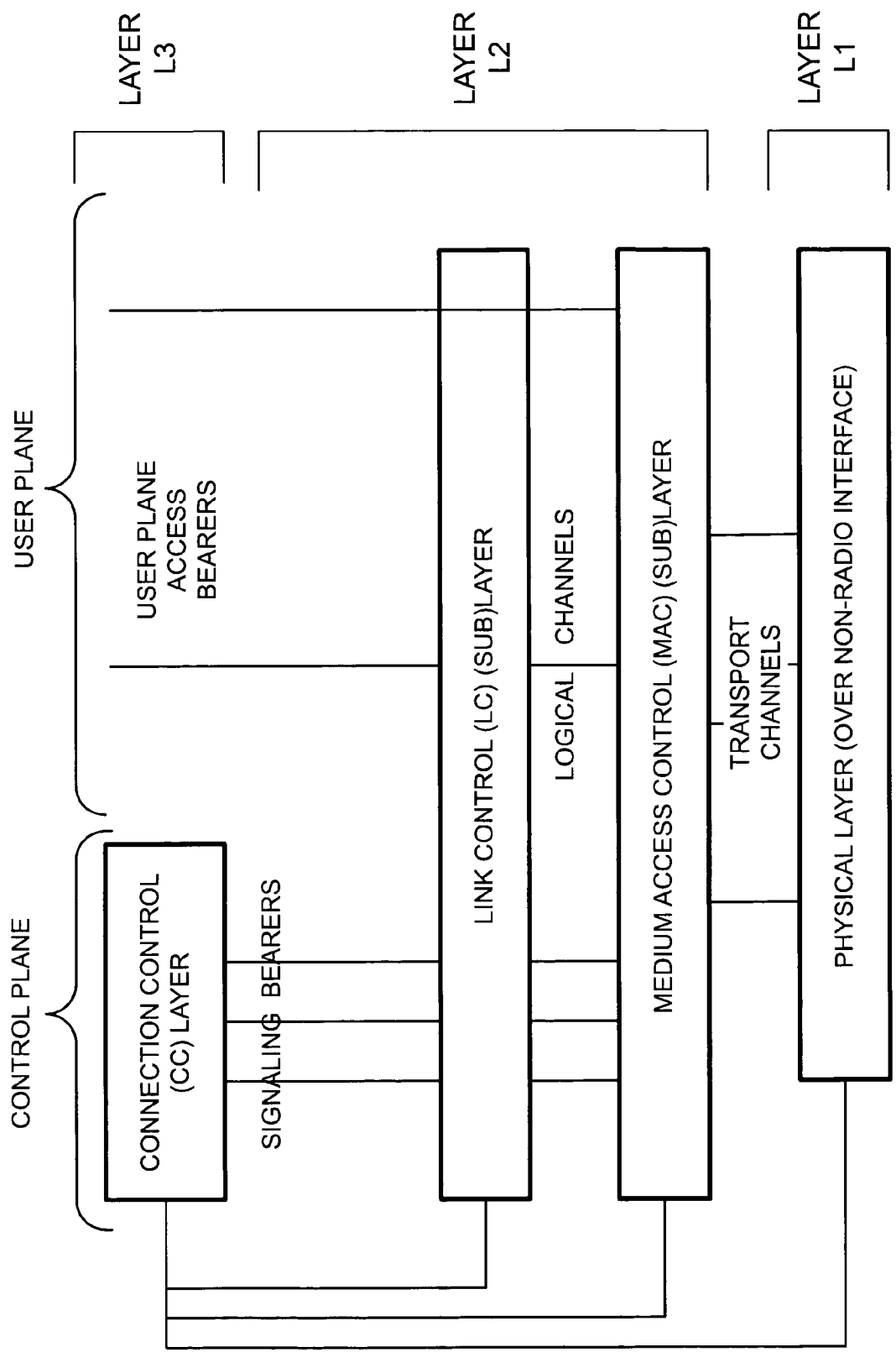
FIG. 2 is a diagrammatic view of network layers for the media access networks of FIG. 1A and FIG. 1B.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures.

Media Access Network

FIG. 1A shows an example embodiment of a media access network 20 wherein a fixed media reception unit, such as stationary equipment unit 22, is connected by a fixed location physical link 24 to an access network controller node (ANCN) 26. The fixed location physical link which connects the access network controller node to the stationary equipment unit can be any wired link or electromagnetic physical medium link which presumes that the locations of the link endpoints are essentially fixed (e.g., an optical link, a radio link which does not require mobility management). The fixed location physical link can thus be a radio link of the type of the Wireless LAN 802.11 specification and very similar to Ethernet over radio waves. (Any LAN application or protocol including TCP/IP runs on an 802.11 wireless LAN as easily as over Ethernet, the data link layer within 802.11 comprising two sublayers LLC and MAC which use the same MAC addressing as Ethernet). However, the fixed location physical link does not encompass radio links of a radio access network which involve or require mobility management. Unless clearly contrary to the context, for sake of brevity subsequent reference herein to "physical link" 24 shall be construed to be a fixed location physical link.

The access network controller node (ANCN) 26 can be connected to one, and preferably plural, external networks (e.g., service provider networks). Preferably the access network controller node (ANCN) 26 is connected to a core network supporting the Iu interface (Iu-CS and Iu-PS). For example, FIG. 1A illustrates access network controller node (ANCN) 26 as being connected across an Iu-CS interface to a circuit switched (connection-oriented) external network $30_1$, across an Iu-PS interface to a packet switched (connectionless) external network $30_2$, to a Broadband Remote Access Server (BRAS) edge router $30_3$, to a video-on-demand service network $30_4$, and to a live television service network $30_5$.

Insofar as access network controller node (ANCN) 26 is concerned, the external network $30_1$ and $30_2$ can be considered as "core" networks. That is, external network $30_1$ can be considered a circuit switched (CS) core network, while external network $30_2$ can be considered a packet switched (PS) core network. For example, the external networks $30_1$ and $30_2$ can respectively be a core mobile circuit switched network and/or a core mobile packet switched network, thereby rendering it possible to provide to the stationary equipment unit (SEU) 22 essentially the same types of access bearers and services as are provided to a WCDMA equipment unit (e.g., handset). The core networks typically provide the traditional telecommunications core functions such as subscription authentication, billing, routing, etc.

It should be understood that the media access network 20 with its access network controller node (ANCN) 26 need not be connected to all of the external networks illustrated in FIG. 1A, or even to any one particular type of external network or any particular combination of external networks. Moreover, the types of external networks to which the media access network 20 is connected can be different from those shown. In other words, the media access network 20 is not dependent on providing any particular media service or combination of media services. What matters from the perspective of the stationary equipment unit (SEU) 22 is that the stationary equipment unit (SEU) 22 be able to support the type of service offered by the external networks in which the user desires to participate.

As used herein, an access bearer is a logical connection with the stationary equipment unit (SEU) 22 through the media access network 20 and corresponds to a single data stream. For example, one access bearer may support one speech connection, another access bearer may support one video connection, and a third access bearer may support one or more data packet connections. Each access bearer is associated with quality of service (QoS) parameters describing how the data stream should be handled. Examples of quality of service parameters include data rate, variability of data rate, amount and variability of delay, guaranteed vs. best effort delivery, error rate, etc. In media access network 20, an access bearer provides the ability to process and transfer user data with variable bit rate and QoS requirements through the ANC and between the stationary equipment unit (SEU) 22 and the Iu interface.

The media access network 20 of FIG. 1A, particularly by virtue of its access network controller node (ANCN) 26, gives stationary equipment unit (SEU) 22 access to plural media services. FIG. 1A shows, by way of example, stationary equipment unit (SEU) 22 executing applications for potentially as many as n number of representative media service types, particularly one or more applications of data services $36_D$; one or more applications of speech services $36_s$; and one or more applications of video services $36_V$; and one or more applications of an nth type of service $36_n$. Not all n number of types of services, or combinations of service types, have to be operating at any moment in time, the illustration of FIG. 1 being provided primarily to show the diversity of service types and the potentially concurrent nature thereof. It should be understood that, in this example illustration, the value of "n" is two or greater, and that there may be some practical limit on the number of access bearers that can be involved with a stationary equipment unit (SEU) 22 at any one time.

The media access network 20 enables the stationary equipment unit (SEU) 22 to use multiple access bearer connections. By way of illustration, in one scenario of operation shown in FIG. 1A when executing the video telephony services $36_{VT}$ the SEU 22 utilizes access bearer $38_1$; when executing the video services $36_V$ the SEU 22 utilizes access bearer $38_2$; when executing the speech services $36_s$ the SEU 22 utilizes access bearer $38_3$; when executing the data services $36_D$ the SEU 22 utilizes access bearer $38_4$, and, when executing the $n^{th}$ type services $36_n$ the SEU 22 utilizes access bearer $38_n$.

The multiple access bearers $38_1$-$38_n$ may be simultaneously employed. As used herein, "simultaneous" means that at least two of the access bearers have at least partial overlap in time utilization. Identical starting and termination of utilization of the access bearers is not necessary for the access bearers to be simultaneous, only that for any moment the two access bearers be utilized.

Moreover, the access bearers $38_1$-$38_n$ may, and typically do, have different bandwidths and different quality of service (QoS). Thus, in essence, to a considerable extent the media access network 20 offers "bandwidth on demand" to the fixed user of stationary equipment unit 22.

An access bearer utilized in media access network 20 can carry one or more plural services of the same service type. That is, many services can run on the same access bearer. For example, FIG. 1B shows the data services access bearer $38_4$ being utilized for the following data service applications: Wireless Application Protocol (WAP) application $39_{WAP}$; short message service (SMS) application $39_{SMS}$; and Multimedia Messaging Service (MMS) application $39_{MMS}$.

While in FIG. 1A, FIG. 1B, and elsewhere herein the connection and operation of one stationary equipment unit (SEU) 22 is described, it will be appreciated that plural stationary equipment units (SEU) 22 are connected to the access network controller node (ANCN) 26. Thus, at any given moment, the access network controller node (ANCN) 26 may be providing access bearers to multiple stationary equipment units (SEU) 22.

Protocol Layers: Overview

As shown in FIG. 2, the media access network 20 of FIG. 1A has a physical layer (L1) which is illustrated in FIG. 1A by the fixed location physical link 24. For media access network 20, the protocol layers above the physical layer (layer L1) are the data link layer (layer L2) and the network layer (layer L3). Layer L2 is split into sublayers. In the control plane, layer L2 contains two sublayers—a first sublayer with the Medium Access Control (MAC) protocol and a second sublayer with the Connection Control (CC) protocol. Layer L3 has the Connection Control (CC) protocol, which belongs to the control plane. Layer L2 and Layer L3 are analogous to the layers of the UTRAN, the UTRAN layers being described by Holma and Toskala, *WCDMA For UMTS Radio Access For Third Generation Mobile Communications*, John Wiley & Sons, Ltd., 2000, which is incorporated herein by reference and excerpts therefrom are included herein.

The physical layer L1 offers services to the MAC layer via transport channels that are characterized by how and with what characteristics the data is transferred. The MAC layer, in turn, offers services to the Link Control (LC) layer by means of logical channels. The logical channels are characterized by what type of data is transmitted. The Link Control (CC) layer offers services to higher layers via service access points (SAPs), which describe how the Link Control (CC) layer handles the data packets. On the control plane, the Link Control (CC) services are used by the Connection Control (CC) layer for signalling transport. On the user plane, the Link Control (CC) services are used by higher-layer u-plane functions (e.g. speech codec). The Link Control (CC) services are called Signalling Bearers in the control plane and Access Bearers in the user plane.

For media access network 20 the control interfaces between the Connection Control (CC) and all the lower layer protocols are used by the Connection Control (CC) layer to configure characteristics of the lower layer protocol entities, including parameters for the physical, transport and logical channels. The same control interfaces are used by the Connection Control (CC) layer, for example to command the lower layers to perform certain types of measurements and by the lower layers to report measurement results and errors to the CC.

In an embodiment of media access network 20 in which the DCH is utilized for the signaling channel, a MAC logical entity is provided in the stationary equipment unit (SEU) 22 and the access network controller node (ANCN) 26. That is, there is one MAC entity in the stationary equipment unit 22 and one MAC entity in the access network controller node (ANCN) 26 for each stationary equipment unit 22. Other MAC entities may be utilized for other purposes or excluded as unnecessary, such as entities which handle the broadcast channel (BCH) and entities which handle the common channels and shared channels.

In the Medium Access Control (MAC) layer the logical channels are mapped to the transport channels. The MAC layer is also responsible for selecting an appropriate transport format (TF) for each transport channel depending on the instantaneous source rate(s) of the logical channels. The transport format is selected with respect to the transport format combination set (TFCS) which is defined by the admission control for each connection.

In the media access network 20, the Link Control (CC) and MAC configuration parameters are adapted to the physical layer speed and to the transport protocol (UDP/IP). Examples of such configuration parameters are the LC PDU size, MAC PDU size, TTI and TFS (Transport Format Set). These parameters are considered configuration data and are configured in the access network controller node (ANCN) 26 for every Access Bearer (AB) type.

Each Transport Channel DCH is configured with a set of transport formats (TFS). In other words, TFS is a set of allowed transport formats for a transport channel DCH. A transport format (TF) describes how data is transmitted on a transport channel. A transport format TF contains the number of bits that should be sent in a transport channel for a certain TTI (Transmission Time Interval). Different TF could be sent in a transport channel depending on the load on the Link. That is, different TF alternatives can be sent over the transport channel. The amount of data that can be sent on each transport channel is restricted by a TFCS (Transport Format Combination Set), which lists all possible Transport Format (TF) combinations.

Thus, MAC is given a limited set of transport format combinations, TFCS. Each transport format combination (TFC) is a combination of currently valid transport formats at a given point of time, containing one transport format for each transport channel.

For each TTI the MAC entities choose a TFC from the TFCS and request the relevant PDU's from LC buffers. The MAC then delivers PDUs from LC buffers, adding the MAC header and tagging a UDP/IP address. A new TFC may also be selected due to the traffic intensity from the CN.

The access bearer (AB) establishment and release function (for the logical channel DTCH) and the CC Connection Handling function (for the logical channel DCCH) provide MAC with TFCS which MAC then uses to schedule the TB (Transport Block) or MAC frame by selecting a TFC from the TFCS.

Every set of Transport Blocks TB that are allowed to be sent during a transmission time interval related to one transport channel (DCH) are carried on to one IP packet transport bearer. The number of TBs for each DCH channel are variable depending on the load on link during the TTI. Every DCH transport channel for one stationary equipment unit (SEU) 22 will have one UDP/IP address, but the size of the IP packet is variable (e.g., containing contain one to n number of TBs).

As mentioned above, the data transfer services of the MAC layer are provided on logical channels. A set of logical channel types is defined for the different kinds of data transfer services offered by MAC. Each logical channel type is defined by the type of information transferred. A general classification of logical channels is into two groups: Control Channels, which are used to transfer control plane information, and Traffic Channels, for user plane information.

The access network controller node (ANCN) 26 controls access bearer (AB) set up and release between the stationary equipment unit 22 and the external networks 30. In an example embodiment, the set up and release of access bearers is in conjunction with LC/MAC and Connection Control (CC) protocols.

The access network controller node (ANCN) 26 facilitates a dynamic establishment of different types of access bearers, the different access bearers not necessarily having the same bit rates and same QoS requirements, but being carried on the same fixed location physical link. For each service type there may be plural simultaneous sessions, and thus plural simultaneous access bearers. Moreover, access network controller node (ANCN) 26 permits a mix of circuit switched and packet switched access bearers on the same fixed location physical link. This mix is independent of the physical link and layer 1 transport technology.

Stationary Equipment Unit (SEU)

The stationary equipment unit (SEU) 22 is said to be "stationary" in the sense that the physical transmission medium for physical link 24 by which stationary equipment unit (SEU) 22 is connected to access network controller node (ANCN) 26 presumes that the locations of the link endpoints (e.g., stationary equipment unit (SEU) 22 and access network controller node (ANCN) 26) are essentially fixed. For example, the stationary equipment unit (SEU) 22 can be connected to ADLS/xDSL or a HUB access broadband termination point with an Ethernet or Wireless (e.g., WLAN) connections.

Optionally, the stationary equipment unit (SEU) 22 may as well have wireless capabilities for connection to mobile networks. Such wireless capabilities may be utilized, for example, when stationary equipment unit (SEU) 22 is situated at its "fixed" location and yet within range of a base station of a radio access network to which stationary equipment unit (SEU) 22 subscribes (in which case the stationary equipment unit (SEU) 22 can utilize either or both of media access network 20 and the radio access network). Alternatively, the wireless capability may be utilized when stationary equipment unit (SEU) 22 is in motion (in which case the stationary equipment unit (SEU) 22 would likely not be connected to media access network 20).

Figure 3:
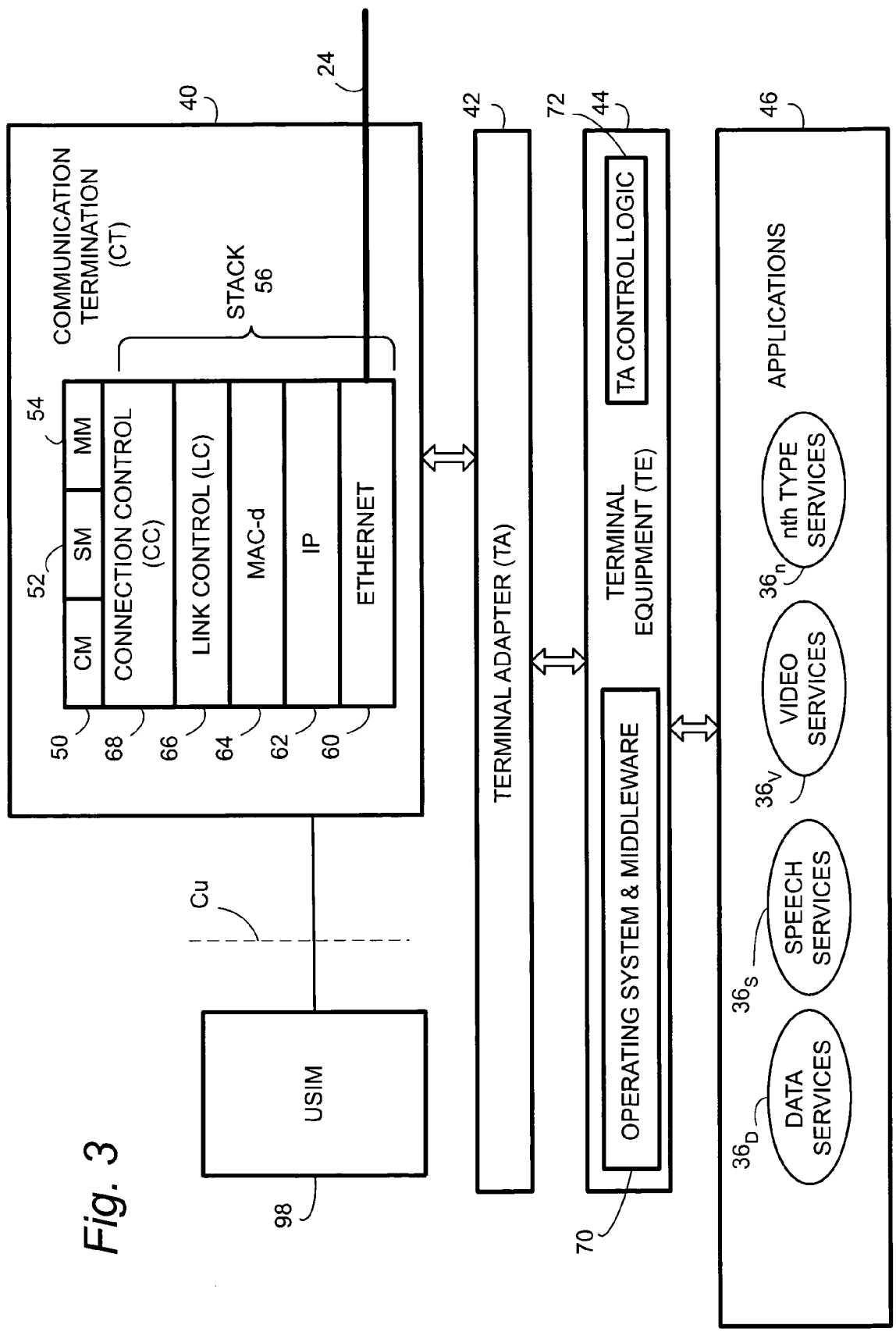
FIG. 3 is a diagrammatic view of functional entities included in an example embodiment of a stationary equipment unit (SEU).

Functional entities for an example, representative, non-limiting stationary equipment unit (SEU) 22 are illustrated in FIG. 3. These general functional entities include: communication termination entity (CT) 40; terminal adapter (TA) 42; terminal equipment 44; and, a set 46 of applications. While each of these entities are described below, it should be understood that the invention is not confined to devices or units having the same physical separation between functional entities, and that the present invention can be implemented in other than the exemplary described functional configuration. In an illustrated example embodiment, communication termination entity (CT) 40 includes the functionality and the communication protocols to connect to the media access network and core network(s). The terminal adapter (TA) 42 generally acts as an adaptation between communication termination entity (CT) 40 and the applications in the set 46 of applications.

In an illustrated example embodiment, communication termination entity (CT) 40 includes the functionality and the communication protocols to connect to the media access network and core network(s). Communication termination entity (CT) 40 includes control management (CM) functions 50; service management (SM) functions 52; mobility management (MM) functions 54; and, a protocol stack 56. In one non-limiting example embodiment which utilizes Internet Protocol (IP) and the DCH transport channel, the protocol stack 56 includes the following protocols/entities (in ascending order): Ethernet protocol/termination entity 60; Internet Protocol (IP) 62; MAC-d entity 64; LC protocol/entity 66; and CC protocol/entity 68. The Ethernet protocol/termination entity 60 is connected to the fixed location physical link 24 through a layer L1 termination unit which is illustrated by box 69 in FIG. 1A.

Terminal equipment 44 normally includes both hardware and software and is preferably a computer or computer platform. Terminal equipment 44 thus has typical aspects of a computer platform, e.g., a processor an operating system and middleware, collectively illustrated by reference numeral 70 in FIG. 2. In addition, terminal equipment 44 has control logic 72 (executed by the processor) for controlling terminal adapter (TA) 42. Control logic 72 performs set-up and release of calls to and from media access network 20.

As shown in FIG. 3, the set 46 of applications illustrated for the example embodiment includes applications appropriate for the service types to which stationary equipment unit (SEU) 22 has access, e.g., to applications for data services $36_D$; applications for speech services $36_s$; applications for video telephony services 36VT; applications for video services $36_V$; and, applications for the nth type services $36_n$. Although unillustrated, other types of services are also possible, such as fax services; circuit switched data services. It will be appreciated by those skilled in the art that the speech service application $36_s$ may take the form of a voice service; the data service application $36_D$ may take the form of an Internet browser, a Wireless Application Protocol (WAP) service, a short message service (SMS), a Multimedia Messaging Service (MMS) service, or an E-mail program, for example. Each application is normally a program which is executed by the processor of terminal equipment 44 and which interacts with the user via, e.g., data input devices such as a keyboard and/or mouse and output or display devices. These applications typically can run on any personal computer (with or without radio access). The applications in set 46 use a number of application programming interfaces (APIs) towards the terminal equipment 44. It will be appreciated that there may be one or more instances of one or more applications of set 46 which are active at any given time. This provides a common access interface to each home/office, which access interface supports all media types, and opens up different opportunities and solutions in the telecom network and in the Wire-line access network.

Figure 4:
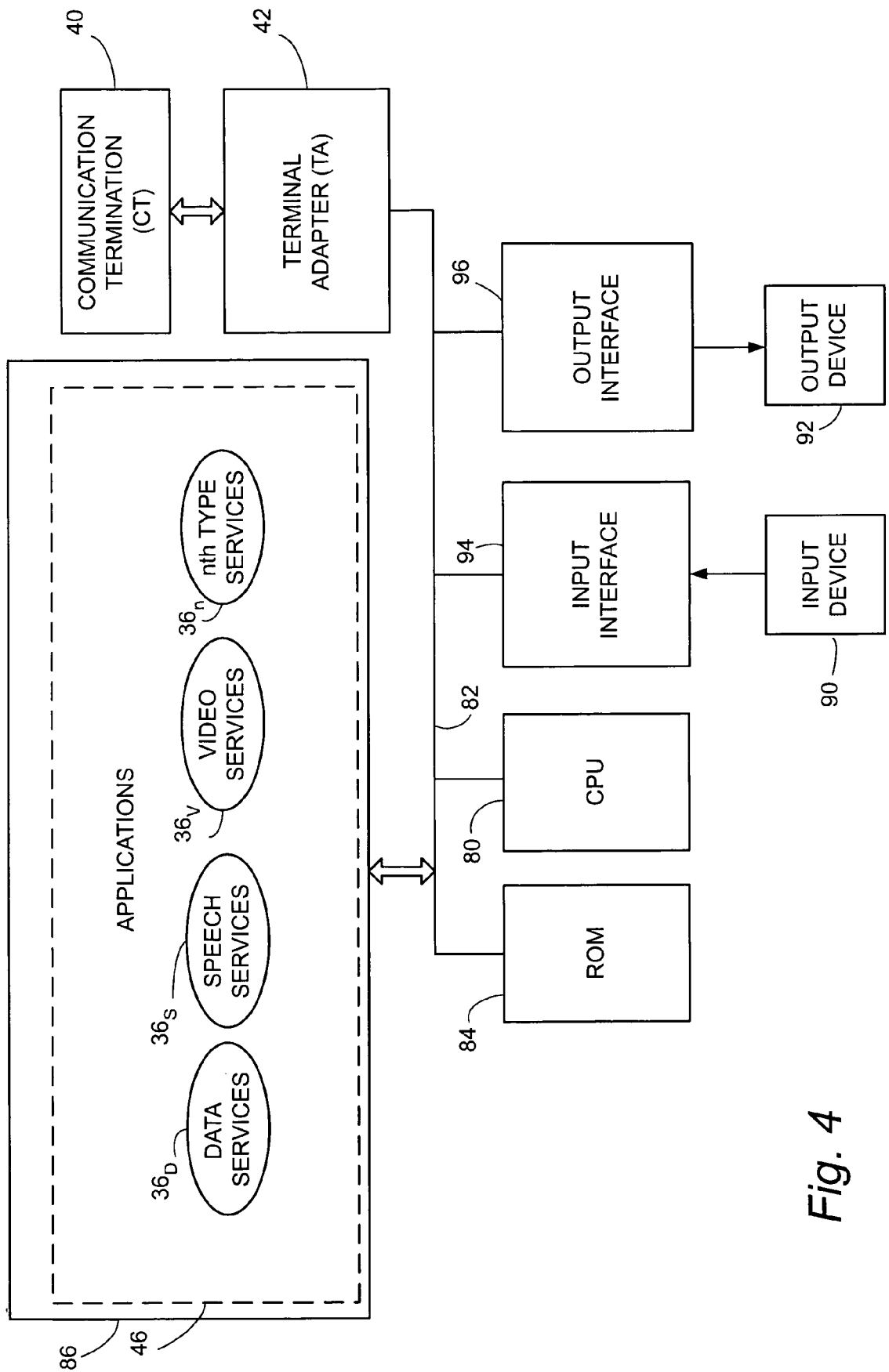
FIG. 4 is a schematic view showing a mapping of functional entities to hardware in stationary equipment unit according to the embodiment of FIG. 3.

FIG. 4 shows how the functional entities of stationary equipment unit (SEU) 22 as illustrated in FIG. 3 are mapped onto hardware components of stationary equipment unit (SEU) 22. In essence, FIG. 4 shows terminal equipment 44 wherein communication termination entity (CT) 40 and terminal adapter (TA) 42 are cards situated in card slots. Terminal adapter (TA) 42 is connected to central processing unit (CPU) 80 by bus 82. Communication termination entity (CT) 40 is connected to terminal adapter (TA) 42 by a cable.

Memories of terminal equipment 44, particularly read only memory (ROM) 84 and random access memory (RAM) 86 are also connected to central processing unit (CPU) 80 by bus 82. In RAM 86 are stored the TA control logic 72, the set 46 of applications, and a TCP/IP stack.

Terminal equipment 44 interfaces with a user through input device(s) 90 and output device(s) 92, each connected through respective appropriate interfaces 94 and 96 to bus 92. Input device(s) 90 can be a keyboard and/or mouse, a microphone, a camera, for example, while output device(s) 92 can take the form of a display device, such as a LCD display panel, an earpiece, a loudspeaker, etc.

Although not necessary for stationary equipment unit (SEU) 22 to connect to media access network 20, the communication termination entity (CT) 40 can also optionally contain a radio transmitter/receiver and communications control toward a radio access network (the radio access network being distinct from media access network 20). Such wireless capability gives the stationary equipment unit (SEU) 22 the prerogative of roaming between different networks, e.g., between wireless and wire-line domains, for example. The communication termination entity (CT) 40 can be a standard mobile pocket telephone (e.g., a GSM phone) or a phone card within stationary equipment unit (SEU) 22. FIG. 3 shows the stationary equipment unit (SEU) 22 as including a USIM device or card 98 which is connected across a Cu interface to communication termination entity (CT) 40. The USIM card (either pre-paid or subscription) may be insertable into or otherwise internal to stationary equipment unit (SEU) 22.

Further to the foregoing, in another embodiment the USIM of the stationary equipment unit (SEU) 22 may even be part of an existing GSM or WCDMA unit (e.g., handset), with the same subscription used for both the handset and the stationary equipment unit (SEU) 22. As a variation of such embodiment, the GSM/WCDMA handset may also swap from using the public WCDMA and GSM frequencies and reconnect to the public network via a local air interface (e.g. bluetooth or W-LAN) for which to communicate to the stationary equipment unit (SEU) 22. In this way services can continue to be used on the GSM/WCDMA handset, but the signalling and user plane data goes over the wireline connection to the access network controller node (ANCN) 26.

As described above, a stationary equipment unit (SEU) 22 may have a USIM card or the like for subscribing or accessing services. Other stationary equipment units which are connected to other service providers, and which may not have a USIM card, perform authentication and subscription operations in other ways, such as (for example) with User-id and PIN code parameters.

The IP address for the stationary equipment unit 22 can be configured or provided by the broadband access provider. One UDP/IP address is needed for every transport channel and access bearer.

In one embodiment, the stationary equipment unit (SEU) 22 can be a user equipment unit or terminal similar to the mobile terminal unit contemplated by the Third Generation Partnership Project (3GPP), but (for the purposes of access to the media services in the manner described herein) instead connected to media access network 20 by a non-UTRAN physical link, e.g., as by a wire line connection. For example, the stationary equipment unit (SEU) 22 can be a 3GPP terminal which does not have (or does not use) its radio part for access to the media services provided via media access network 20, so long as the terminal can potentially participate in services acquired over the fixed location physical link from media access network 20. In other words, the stationary equipment unit (SEU) 22 utilizes the CC, LC, and MAC protocols of media access network 20 which run over a layer L1 protocol such as IP and ATM.

Access Network Controller Node (ANCN)

The access network controller node (ANCN) 26 provides a common access interface to establish multi access bearer channels to each user's equipment, e.g., each stationary equipment unit 22. The access network controller node (ANCN) 26 utilizes different types of access bearers dynamically, e.g., establishing and/or allocating as needed an appropriately configured access bearer. The access network controller node (ANCN) 26 establishes/allocates the access bearer, e.g., in response to initiation of a media service at stationary equipment unit (SEU) 22. The access bearers are established using layer L2 and layer L3 protocols. The access bearers can even be established to provide a mix of circuit switched access bearers and packet switched access bearers on the same fixed location physical link simultaneously, with the access bearers being of different quality of service (QoS), e.g., different bit rates. The access bearers are established dynamically by the access network controller node (ANCN) 26 using the Connection Control (CC) protocol of the media access network 20 and the LC/MAC protocol of the media access network 20 for the access bearer user plane.

Figure 5:
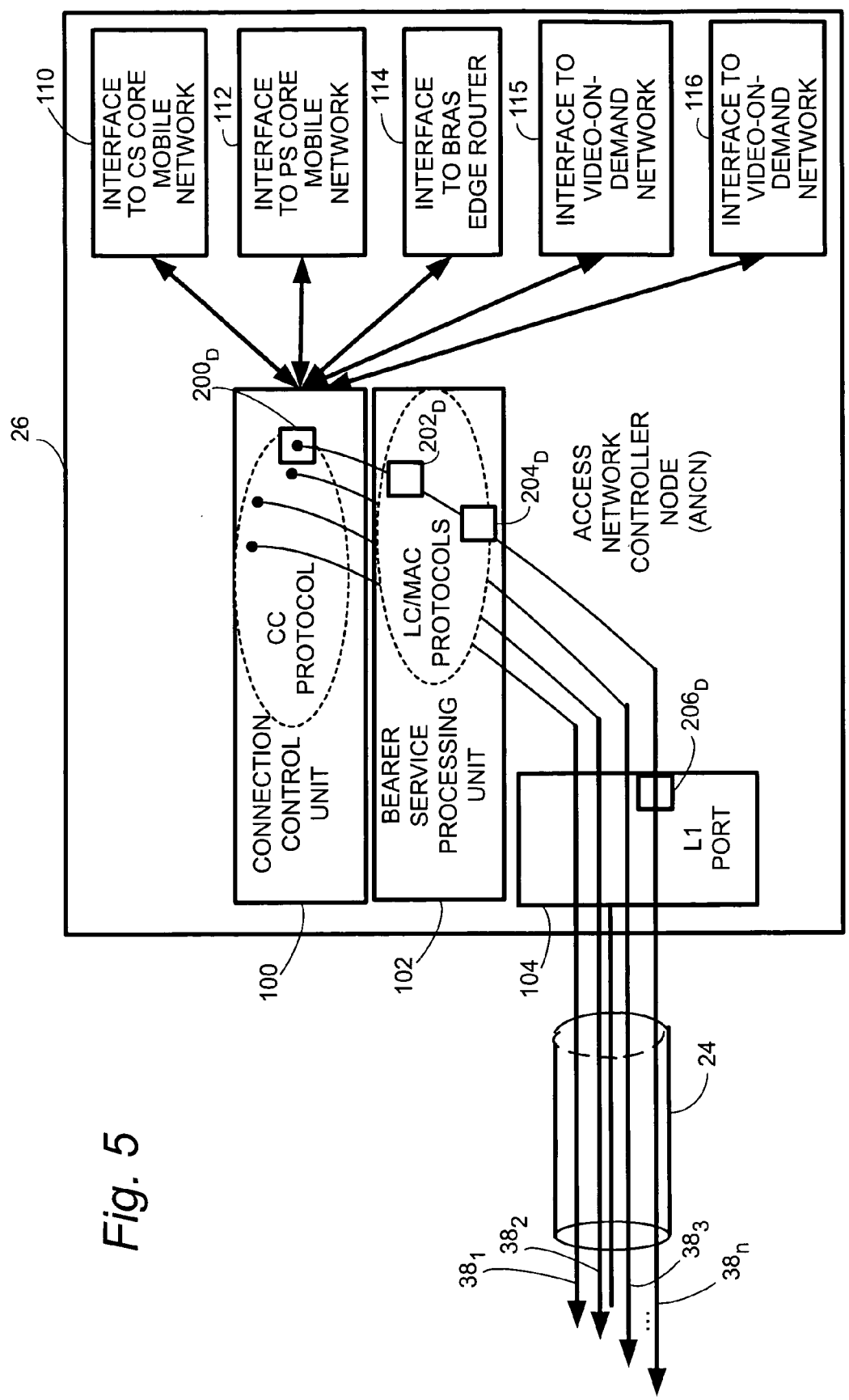
FIG. 5 is a schematic view of functional aspects of an example access network controller node (ANCN) according to an example embodiment.

In one example, illustrative, non-limiting embodiment of access network controller node (ANCN) 26 illustrated in FIG. 5, the access network controller node (ANCN) 26 is shown as comprising a connection control unit 100 and a bearer service processing unit 102. The connection control unit 100 establishes access bearers for providing services to the stationary equipment unit (SEU) 22 and implements the Connection Control (CC) protocol of media access network 20. The bearer service processing unit 102 maps multiple simultaneous access bearers into packets of a transport protocol of the physical link of physical layer L1 (see FIG. 2), and implements the LC/MAC protocol of media access network 20. In one example implementation, the bearer service processing unit 102 maps the multiple simultaneous access bearers into packets of the transport protocol of the physical link.

The access network controller node (ANCN) 26 further includes, in the example embodiment of FIG. 5, a port 104 or termination unit for the physical layer (layer L1). The port 104 can either be internal to access network controller node (ANCN) 26 as shown in FIG. 5, or external to access network controller node (ANCN) 26. Further, in an example implementation the access network controller node (ANCN) 26 may include an interface 110 toward the circuit switched core mobile network $30_1$; an interface 112 toward the packet switched core mobile network $30_2$; and, an interface 114 toward the BRAS edge router $30_3$.

The QoS determination as made by the access network controller node (ANCN) 26 is based on several factors. These factors include advanced classification and queuing, the particular transport layer utilized (IP using Diffserv or AAL2/ATM), and the upper layer (LC/MAC) marking to support granular bandwidth policing to support different-bandwidth service levels.

The port 104 of included in or associated with access network controller node (ANCN) 26 terminates the connections from the user equipment, e.g., from the stationary equipment unit 22. For example, the port 104 can be or comprise an ADSL modem pool node (e.g., AAL2/ATM/ADSL) or an IP/Ethernet or a IP/PPP/E1. In the case of an ADSL modem pool, the port 104 would be external to access network controller node (ANCN) 26 rather than the internal location shown in FIG. 5. The layer L1 termination can be configured in dependence upon the particular user equipment terminal type and the particular medium utilized for fixed location physical link 24. In other words, the access network controller node (ANCN) 26 can provide support for various different types of fixed location physical links 24.

Every stationary equipment unit 22 is connected to an appropriate MAC entity in the access network controller node (ANCN) 26. Typically the MAC entity is included in bearer service processing unit 102. In a previously described example embodiment in which the DCH is utilized as the transport channel, the MAC entity is a MAC-d entity. In other embodiments MAC-c or other entities can be used as appropriate to connect the stationary equipment unit (SEU) 22 to the access network controller node (ANCN) 26. Moreover, the stationary equipment unit (SEU) 22 may have additional Connection Control (CC) connection states to those described in Connection Control (CC) protocol specifications.

In one example, non-limiting embodiment, the access network controller node (ANCN) 26 can be a switched-based node having a switch 120. The switch 120 serves to interconnect other constituent elements of access network controller node (ANCN) 26. The switch 120 can be an ATM switch or packet switch.

Such other constituent elements of access network controller node (ANCN) 26 include one or more extension terminals, or even pools of extension terminal devices. The example access network controller node (ANCN) 26 illustrated in FIG. 6 comprises extension terminals $122_1$ through $122_n$, as well as extension terminals $124_{CS}$, $124_{PS}$, and $124_{BRAS}$. Extension terminals $122_1$ through $122_n$ essentially function to connect access network controller node (ANCN) 26 to plural stationary equipment units 22 served by access network controller node (ANCN) 26. The extension terminals $122_1$ through $122_n$ can comprise the ports 104 which serve as the layer L1 termination units for physical connections to respective ones of the stationary equipment units served by the access network controller node (ANCN) 26.

Extension terminal $124_{CS}$ connects access network controller node (ANCN) 26 across the Iu-CS interface to the circuit switched core mobile network $30_1$; extension terminal $124_{PS}$ connects access network controller node (ANCN) 26 across the Iu-PS interface to the packet switched core mobile network $30_2$; extension terminal $124_{BRAS}$ connects access network controller node (ANCN) 26 to the BRAS edge router $30_3$. The extension terminals $124_{CS}$, $124_{PS}$, and $124_{BRAS}$ can comprise the interfaces 110, 112, and 114, respectively, shown in FIG. 5. Although FIG. 6 shows only three extension terminals, it should be understood that other extension terminals can also be provided in accordance with the number of external core networks or services to which the access network controller node (ANCN) 26 is connected.

Yet other constituent elements of access network controller node (ANCN) 26 include a packet control unit (PCU) 128; codec 130; timing unit 132; a data services application unit 134; and, a main processor 140. While one or more of these elements may comprise an example embodiment, not all these elements are necessary for a access network controller node (ANCN) 26. For example, codec 130 may be utilized for some network technologies such as CDMA 2000, but not necessary for other technologies such as WCDMA. In any event, the person skilled in the art will appreciate generally the functions of these constituent elements. For example, the packet control unit (PCU) 128 provides, e.g., for separation of packet data and circuit-switched data when it is received from the stationary equipment units 22 and multiplexes the different data streams from circuit-switched and packet-switched core networks onto common streams going down to the cells. The PCU can alternatively be located physically separate from the access network controller node (ANCN) 26.

Figure 6:
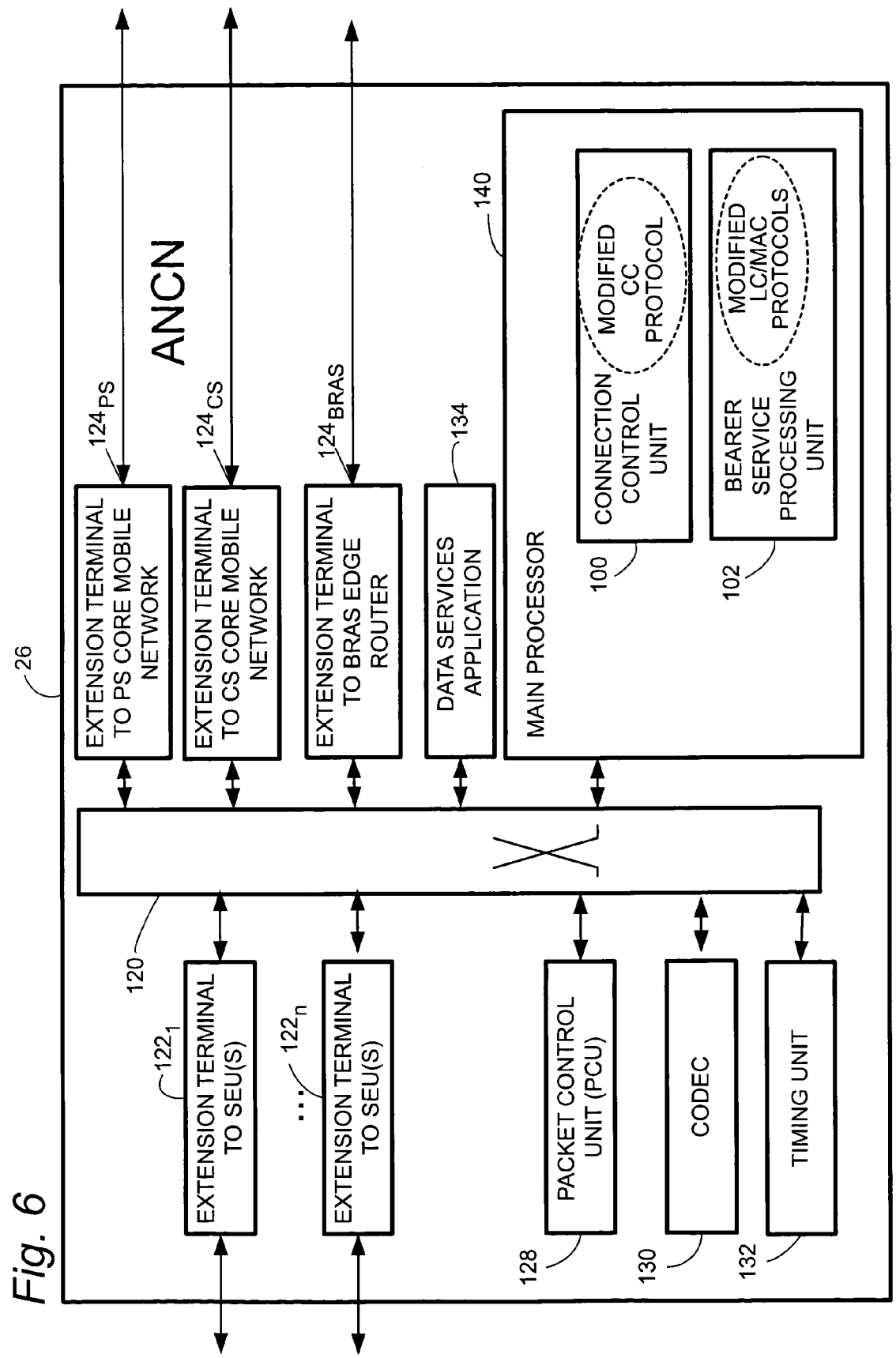
FIG. 6 is a schematic view of hardware aspects of an example access network controller node (ANCN).

In the example embodiment of the access network controller node (ANCN) 26 of FIG. 6, the role of the connection control unit 100 and the bearer service processing unit 102 can executed or performed by main processor 140, or another processor of access network controller node (ANCN) 26. Those skilled in the art will appreciate that the functions of the connection control unit 100 and the bearer service processing unit 102 may be implemented using individual hardware circuits, using software functioning in conjunction with a suitably programmed digital microprocessor or general purpose computer, using an application specific integrated circuit (ASIC), and/or using one or more digital signal processors (DSPs).

As another aspect or embodiment, advantageously a radio network controller (RNC) node of a UTRAN may be adapted or easily transformed to serve as the access network controller node (ANCN) 26. In such embodiment, the access network controller node (ANCN) 26 can essentially "reuse" or otherwise capitalize upon aspects of the UTRAN RLC/MAC and RRC protocols which are common to or borrowed by the CC/MAC and Link Control (CC) protocols of media access network Physical Link The fixed location physical link 24 is illustrated in FIG. 1A as a cylinder or pipe for the sake of illustrating that multiple simultaneous access bearers 38 are borne over a single physical link or connection 24. As indicated previously, the fixed location physical link which connects the access network controller node to the stationary equipment unit can be any wired link or electromagnetic physical medium link which presumes that the locations of the link endpoints are essentially fixed. As such, the fixed location physical link 24 encompasses (for example) wire links, optical links, and radio links which do not require mobility management. Accordingly, the primary functionality of the access network controller node (ANCN) 26 is independent of the particular layer L1 protocol which is employed. A few example possible physical links and transport networks which could be used for the physical layer L1 (e.g., for fixed location physical link 24) include ATM/ADSL; Ethernet/ATM/ADSL based on the Ethernet DSL; and, Internet Protocol (IP) used as the transport protocol. For example, the existing ATM/ADSL could be used, preferably with a modification to include the AAL2 ATM layer switching (AAL2/ATM/ADSL) for use of the full functionality of the access network controller node (ANCN) 26. For Ethernet/ATM/ADSL based on the Ethernet DSL Access, when using the access network controller node (ANCN) 26 the Ethernet should be considered as point-to-point transport layer (Ethernet switching is not needed). The IP transport protocols can include IP/Ethernet, IP/PPP/ADSL, or IP/PPP/E1. The IP (Internet Transport Protocol) has to be supported in access network controller node (ANCN) 26 as a transport protocol for the access bearer channels.

Operation: Example of Access Bearer Sequence Connection

Turning on the stationary equipment unit (SEU) 22 essentially serves to "deblock" the stationary equipment unit (SEU) 22. Upon deblocking, the stationary equipment unit (SEU) 22 is eligible for control signalling with access network controller node (ANCN) 26. Most of the control signalling between stationary equipment unit 22 and access network controller node (ANCN) 26 is in the form of Connection Control (CC) protocol messages. These Connection Control (CC) messages carry the parameters required to set up, modify and release layer L2 and layer L1 protocol entities. Connection Control (CC) messages carry in their payload all higher layer signalling.

At deblocking of stationary equipment unit (SEU) 22, a control channel connection is set up which is somewhat analogous to the control channels in the WCDMA air interface. While it would be possible to use common channels like the WCDMA RACH, FACH and PCH channels towards the stationary equipment unit, preferably only one control channel connection is utilized in order to save load and memory in access network controller node (ANCN) 26 and in stationary equipment unit (SEU) 22, and to give better characteristics. In the illustrated embodiment, that one control channel is a dedicated control channel (DCCH) which is established using a Connection Control (CC) connection request message hereinafter described.

Operation: Connection Control (CC) Connection Setup

After deblocking of the stationary equipment unit (SEU) 22 and upon initiation of an instance of one of the media applications in application set 46, as the first action 7A-1 for setting up an Connection Control (CC) connection the stationary equipment unit (SEU) 22 transmits a CC Connection Request message to media access network 20, e.g., to access network controller node (ANCN) 26. The CC Connection Request message 7A-1 is sent over the DCCH channel from stationary equipment unit (SEU) 22 to access network controller node (ANCN) 26. The CC Connection Request message 7A-1 includes a transport information element or traffic descriptor. In the case of IP transport, the traffic information element can be, e.g., a UDP/IP address. On the other hand, if AAL2 switching is used as a transport protocol on layer L1, the traffic descriptors could be sent at the establishment of the AAL2 connection of the default transport channel DCCH (as currently in UTRAN) with an AAL2 payload of variable length (up to 45 bytes) and AAL2 header 3 bytes. The transport information contains the necessary information to map every type of Access bearer to the transport bearers (IP packets, AAL2/ATM cells): LC PDU size, MAC PDU size, TB transport blocks size to be sent over a transport bearer during a TTI=Time to Transmission interval, TTI, etc. In case of AAL2 these parameters are used to reserve the bandwidth for a certain Access bearer. Unlike AAL2/ATM, in the case of IP there is no reservation of bandwidth. Conventional UTRAN measured information elements, such as measured results on RACH are not used or included in the CC Connection Request message 7A-1. Moreover, UE system specific capability, Inter-RAT UE radio access capability IE is not used.

Upon receipt of the CC Connection Request message 7A-1, as action 7A-2 the access network controller node (ANCN) 26 establishes or allocates protocol entities in layer L1, layer L2, and layer L3 for the application initiated at the stationary equipment unit (SEU) 22. For example, for the data service $36_D$ illustrated in FIG. 1A and FIG. 5, the following protocol entities are established or allocated: Connection Control (CC) protocol entity $200_D$; Link Control (CC) protocol entity $202_D$; MAC-d protocol entity $204_D$; and L1 protocol entity $206_D$. Although not shown as such in FIG. 5, it will be appreciated that for other existing connections comparable protocol entities are established/allocated for each layer.

In case of IP transport protocol, no reservation of the bandwidth is done, but the number of simultaneous access bearers (ABs) on a specific connection could be limited at Connection Control (CC) connection set up after a capacity check. That is, in the case of IP transport protocol, the access network controller node (ANCN) 26 can check the traffic load on the access towards the stationary equipment unit (SEU) 22 and check the number of access bearers already established as well as their types and their bit rates, and decides whether to accept new access bearer set up or not.

After receipt of the CC Connection Request message 7A-1 and establishment of the protocol entities (see action 7A-2), as action 7A-3 the access network controller node (ANCN) 26 transmits a CC Connection Setup message to stationary equipment unit (SEU) 22. The CC Connection Setup message 7A-3 is thus sent by media access network 20 to indicated acceptance and establishment of a Connection Control (CC) connection for the stationary equipment unit (SEU) 22. Like CC Connection Request message 7A-1, the CC Connection Setup message 7A-3 is transmitted over the DCCH channel.

The CC Connection Setup message 7A-3 includes assignment of control link information, and transport channel information. Unlike a similarly named UTRAN CC Connection Setup message, the CC Connection Setup message 7A-3 of the media access network 20 does not have radio resource information. In this respect, an information element such as the PhyCH information element traditionally used in a UTRAN message does not have content pertaining to radio resources, but instead may be utilized for conveying transport channels. For example, the TrCH information element (or other information element ) can convey or transfer to the stationary equipment unit (SEU) 22 the UDP/IP address of the transport channels when IP is utilized for the transport layer L1.

After receipt and processing of the CC Connection Setup message 7A-3, as action 7A-4 the stationary equipment unit (SEU) 22 uses the information obtained from the CC Connection Setup message 7A-3 to establish (at stationary equipment unit (SEU) 22) protocol entities which correspond to those established at action 7A-2 at access network controller node (ANCN) 26. Then the stationary equipment unit (SEU) 22 transmits a CC Connection Setup Complete message 7A-5 to access network controller node (ANCN) 26. The CC Connection Setup Complete message 7A-5 serves as the confirmation by the stationary equipment unit (SEU) 22 of the establishment of the Connection Control (CC) Connection. The CC Connection Setup Complete message 7A-5 is also sent using a DCCH logical channel.

On receipt of the CC Connection Setup Complete message 7A-5, the access network controller node (ANCN) 26 has set up a signalling channel which is analogous to a Signalling Radio Bearer (SRB) in WCDMA. Once the Signalling Access Bearer (SAB) is set up, the first action of the stationary equipment unit (SEU) 22 (after establishing the connection for the first time after a period of being switched off (off state)) is to perform a Location Update signalling procedure. This is a signalling sequence between stationary equipment unit (SEU) 22 and the core network on the Non Access Stratum level. By this action, the stationary equipment unit (SEU) 22 becomes registered as being active in the service providers network. The stationary equipment unit (SEU) 22 is then considered active (analogous to being in state cell_DCH connected in WCDMA RRC protocol definition). This is just one possible scenario or embodiment, there being different or parallel solutions which use the common channel concepts and PCH, FACH and RACH channel concepts). The stationary equipment unit (SEU) 22 is then connected and is ready to accept terminating calls and make originating calls, in the case of the stationary equipment unit (SEU) 22 being connected to a WCDMA Core Network. In other examples of service provision network this takes the form of the stationary equipment unit (SEU) 22 being able to communicate, request and receive, terminate media and data services by using non access stratum messages embodied in the payload of the Connection Control (CC) Direct Transfer messages.

Operation: Access Bearer Setup

Figures 7A, 7B:
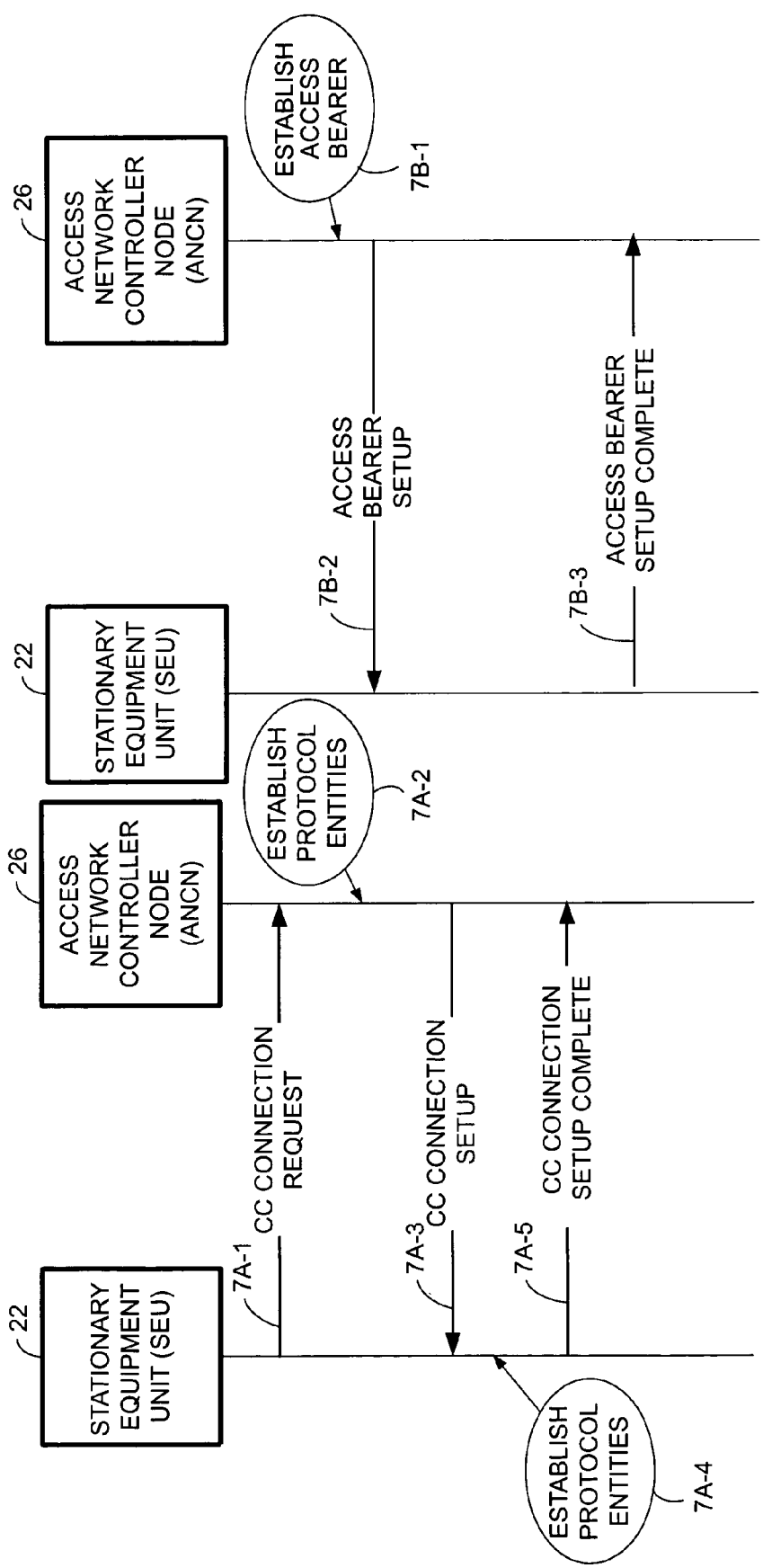
FIG. 7A is a diagrammatic view showing certain example basic actions involved in a Connection Control (CC) Connection Setup procedure.
FIG. 7B is a diagrammatic view showing certain example basic actions involved in an Access Bearer Setup procedure.

Once the stationary equipment unit (SEU) 22 is connected to access network controller node (ANCN) 26 in the manner described above with reference to FIG. 7A, the access bearer (AB) is allocated or established as depicted by action 7B-1 in FIG. 7B. The person skilled in the art will understand the various considerations involved in the access network controller node (ANCN) 26 determining which access bearer to assign. For example, considerations and/or criteria such as those employed in UTRAN can be utililized.

After establishing the access bearer, as step 7B-2 the access network controller node (ANCN) 26 sends a Access Bearer Setup message to stationary equipment unit (SEU) 22 for the purpose of establishing the access bearer(s). The Access Bearer Setup message 7B-2 is transmitted over the DCCH logical channel. The type of access bearer is included in the Access Bearer Setup message 7B-2. The Access Bearer Setup message 7B-2 includes the transport information element (e.g., UDP/IP address in the case of IP transport). The Access Bearer Setup message 7B-2 also contains an identification of the access bearer. The person skilled in the art understands how such identification is made.

The Access Bearer Setup message 7B-1 resembles the comparably named UTRAN message known as the Radio Bearer Setup message. However, whereas the information element PhyCH of the UTRAN Radio Bearer Setup message described radio resources, radio resource descriptions are not conveyed or utilized in media access network 20. Therefore, in media access network 20 the PhyCH information element can include the transport channel, e.g., the UDP/IP address of the transport channels.

Upon receipt of the Access Bearer Setup message 7B-2 the stationary equipment unit (SEU) 22 is advised of the pertinent access bearer information. Then, as action 7B-3, the stationary equipment unit (SEU) 22 acknowledges receipt by transmitting an Access Bearer Setup Complete message. The Access Bearer Setup Complete message 7B-3 is thus sent by stationary equipment unit (SEU) 22 to confirm the establishment of the radio bearer. The Access Bearer Setup Complete message 7B-3 is sent over the DCCH logical channel. As in previously described Connection Control (CC) messages, the PhyCH information element can be appropriated to refer to transport channels (e.g., to carry the UDP/IP address of the transport channels).

After the access bearer to be utilized by an application service has been established in the manner generally described above, data packets belonging to the media service of the application can be transmitted from and to stationary equipment unit (SEU) 22. The ensuing further description of protocols affirms the processing of the data packets.

Operation: Connection Control (CC) Protocol

In a non-limiting example implementation, the Connection Control (CC) protocol utilized by the media access network 20 of FIG. 1A and residing in layer L3 of FIG. 2 has information elements which relate to the underlying layer L1 (transport) network. The adding of the information elements for the underlying network can be accomplished by "reusing" certain information elements which otherwise would be removed as pertaining to the radio resources. For example, the TrCH transport channels information elements can be reused to relate to the underlying network. The underlying network can be, for example, the Internet Protocol (IP) or the AAL2/ATM transport protocol. In the case of IP, the UDP/IP address of the two end point flows (stationary equipment unit and "RNC") are sent in TrCH.

Depending on the solution chosen or particular implementation, it may be necessary to adapt the Connection Control (CC) protocol in other ways. For example, one UTRAN message which may be obsolete is the Paging Type 1 message, since this message is sent on a paging channel which is not needed for media access network 20. Rather, in media access network 20 a Paging Type 2 message is used in all cases to inform the stationary equipment unit (SEU) 22 that a service request has been received in the core network pertaining to a stationary equipment unit (SEU) 22. Also, in order to achieve good telecommunications quality service, it may be necessary to introduce a form of 'keep alive' or two-way periodic polling of the stationary equipment unit (SEU) 22 and access network status. This is a way of guaranteeing the integrity of the connection between stationary equipment unit (SEU) 22 and the service provider's network. Also it is a way of solving the problem with the stationary equipment unit (SEU) 22 being switched off without being able to send a CC Connection Release Complete message. In one embodiment of the solution, timers are used to measure the period of inactivity of the stationary equipment unit (SEU) 22, the timers being in both the stationary equipment unit (SEU) 22 and the access network controller node (ANCN) 26. On expiry of the timer in either the stationary equipment unit (SEU) 22 or the access network controller node (ANCN) 26, a message followed by acknowledgement is sent to confirm that the SRB connection is still active. If not active, a new CC Connection request message is sent.

Operation: User Plane Protocols

In the user plane, in media access network 20 the Iu UP, LC, and MAC (e.g., MAC-d) are used in essentially the same manner as in UTRAN. A Transmission Time Interval (TTI) is assigned to every DCH established for MAC policing. In the transmitter, TTI timeouts (set to 2^N10 ms, n=0, 1, 2, 3) are aligned, i.e.,: all TTI timeouts coincide for every largest TTI interval. No CFN is defined. After the TFCS scheduling algorithm has been run, transport blocks are framed into IP packets or AAL2/ATM cells, and immediately sent towards the receiver. No TTI is defined for the receiver, i.e. blocks contained in IP packets or AAL2/ATM cells are passed at once towards higher layers.

MAC size (TB Transport Block) and TTI length are AB access bearer and transport bandwidth specific. They are configurable depending on the physical layer speed. For example, if there is to be higher bandwidth transport, the MAC size (TB) for a certain access bearer (AB) can be set larger as there is the possibility to send more bits for the same duration of time. In an example mode, the TTI is the same as defined in the air interface. In the case of IP transport protocol, no reservation of the bandwidth are needed, but the number of simultaneous access bearers (ABs) on a specific connection could be limited at Access Bearer set up after a capacity check in access network controller node (ANCN) 26.

The UDP/IP address of the stationary equipment unit is sent to access network controller node (ANCN) 26 using the CC Connection Setup Complete message 7A-3 and the Access Bearer Setup Complete message 7B-3. The UDP/IP of the termination point of a transport channel flow in access network controller node (ANCN) 26 is sent to stationary equipment unit (SEU) 22 using the CC connection set up message 7A-1 and the Radio bearer set up message 7B-2.

Operation: Link Control (LC) Protocol

Figure 8:
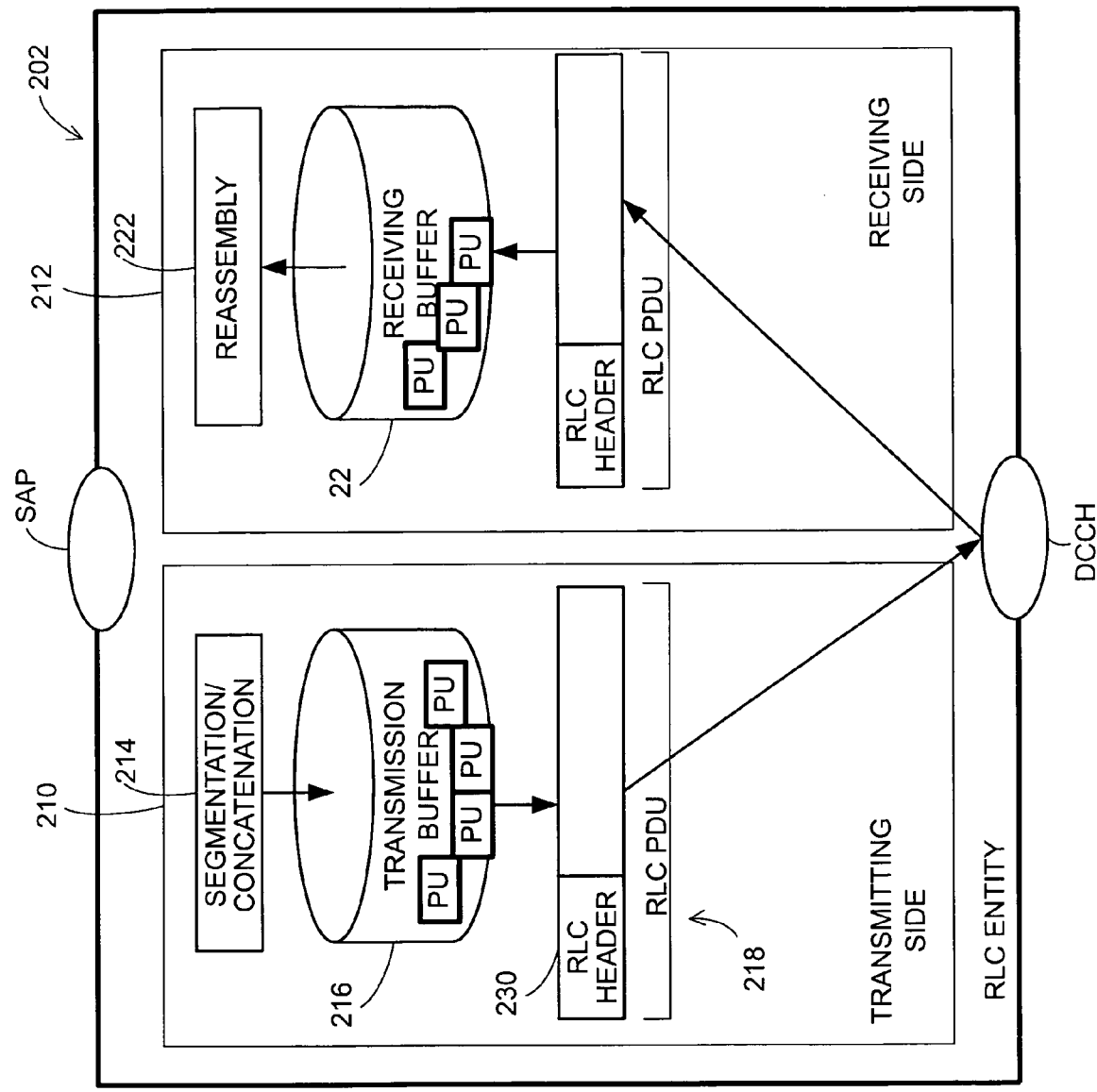
FIG. 8 is a schematic view of an example Link Control (LC) entity.

FIG. 8 shows certain basic aspects of a generic Link Control (CC) entity 202 established in bearer service processing unit 102 of access network controller node (ANCN) 26. The Link Control (CC) entity 202 has both a transmitting side 210 and a receiving side 212. The transmitting side 210 has, among other elements, a segmentation/concatenation unit 214; a transmission buffer 216; and LC PDU formation unit 218. The receiving side 212 has, among other things, a receiving buffer 220 and a reassembly unit 222. Thus, in view of the respective units 214 and 222, the LC layer architecture provides segmentation and retransmission services for both user and control data.

As shown in FIG. 8, on a transmitting side of an Link Control (CC) entity in access network controller node (ANCN) 26, data packets received (LC SDU) from higher layers via SAP are segmented and/or concatenated by segmentation/concatenation unit 214 to payload units (PU) of fixed length. The PU length is a semi static value that is decided in Access Bearer Set up and can only be changed through the Connection Control (CC) Access Bearer reconfiguration procedure. For concatenation or padding purposes, bits carrying information on the length and extension are inserted into the beginning of the last PU where data from an SDU is included. If several SDUs fit into one PU, they are concatenated and the appropriate length indicators are inserted into the beginning of the PU. The PUs are then placed in transmission buffer 216, which, in this example, also takes care of retransmission management.

In case of a fixed network with higher bit rate speed, the Link Control (CC) can work in transparent mode and /or unacknowledged mode. The mode and the LC PDU size are both configurable.

In the transparent mode, no protocol overhead is added to the higher layer data. An erroneous LC PDU can be discarded or marked erroneous. Transmission with limited segmentation reassembly capability can be accomplished. As further shown in FIG. 8, an LC PDU is constructed by taking one PU from the transmission buffer 216. For the transparent mode, a LC PDU header 230 contains the LC PDU SN sequence number (12 bits), a poll P bit, and (optionally) a length indicator used for the concatenation. At the end the LC PDU header 230 is two octets.

In the unacknowledged mode (UM) no retransmission protocol is in use. Received erroneous data is either marked or discarded depending on the configuration. The LC SDU that is not transmitted within a specified time is simply removed from the transmission buffer. For the UM mode, the protocol overhead is three octets, and the size of the LC PDU could be larger.

The LC PDU size can be adjusted, e.g., could be larger, based on the layer L1 transmission speed.

Protocol: MAC Layer

The MAC layer with its MAC-d protocol entities 204 performs a similar functionality as in the case when the physical layer is the WCDMA radio interface. But in the media access network 20, the physical layer is not the radio interface, but a non-radio physical interface.

Figure 9A:
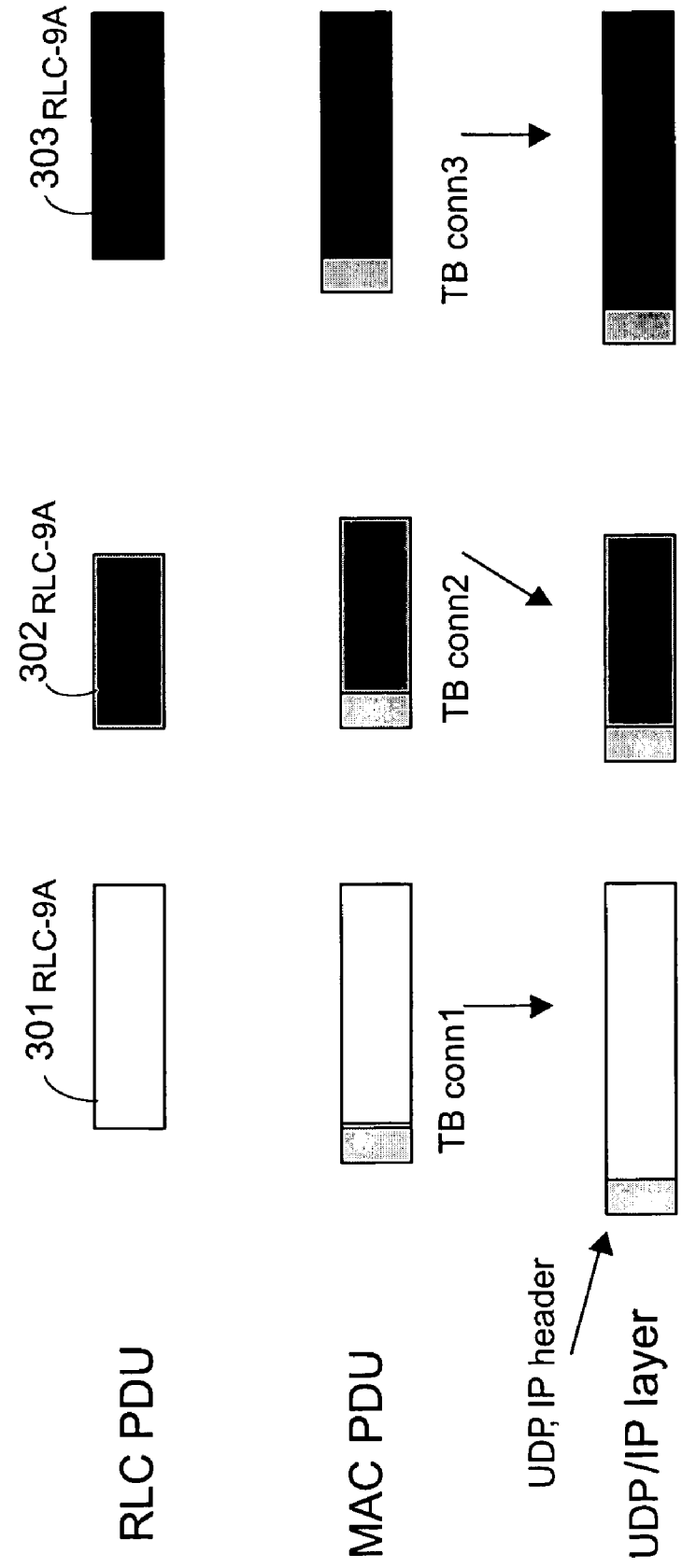
FIG. 9A is a diagrammatic view showing a mapping between different layers for three different access bearers when the physical layer is an IP layer.
Figure 9B:
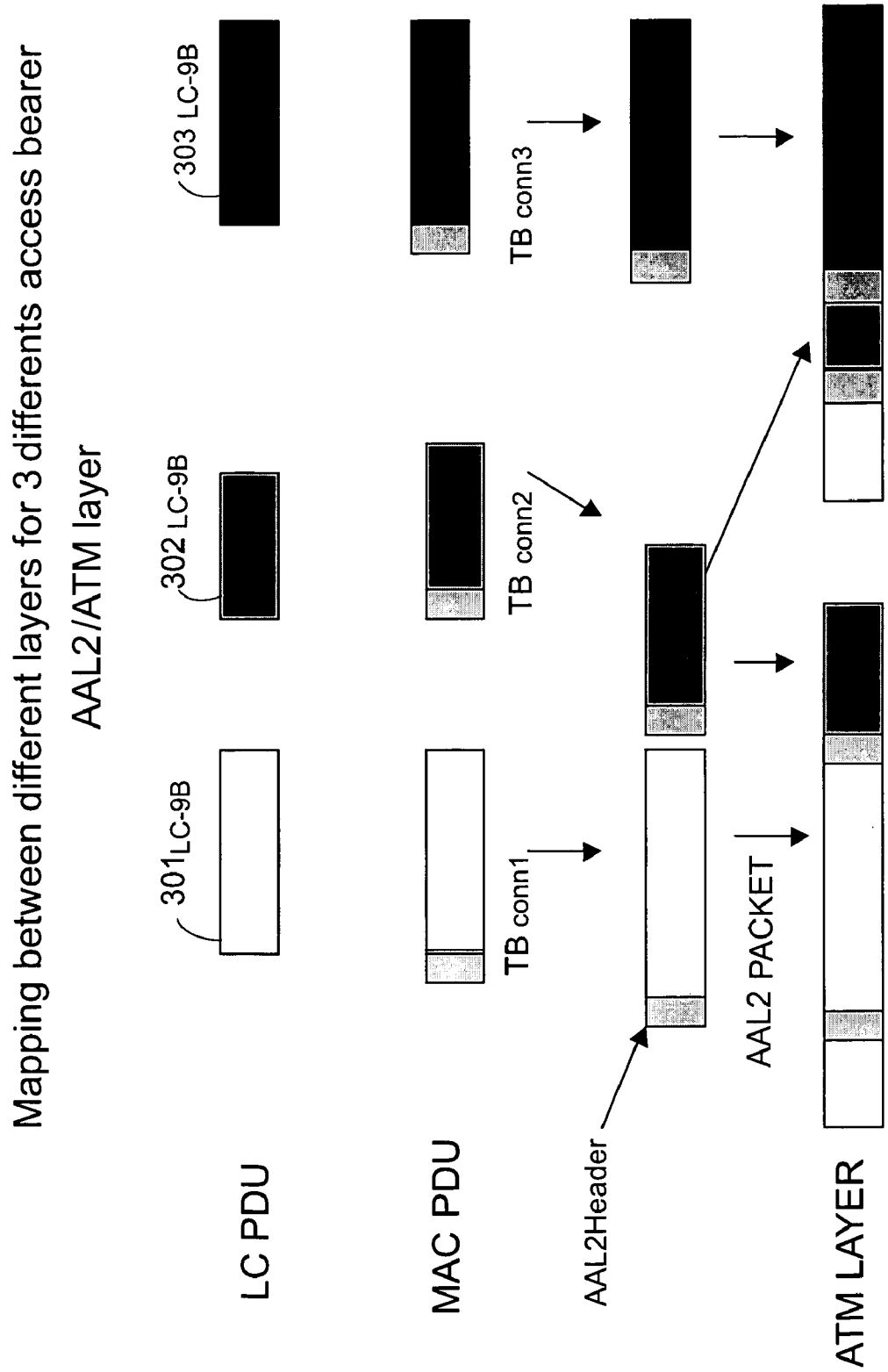
FIG. 9B is a diagrammatic view showing a mapping between different layers for three different access bearers when the physical layer is an AAL2/ATM layer.

In the MAC layer the logical channels from the Link Control (CC) layer are mapped to the transport channels MAC frames (e.g., to MAC PDUs). In the Layer 1 protocol the transport channels MAC frames are encapsulated either into UDP/IP packets or into AAL2/ATM packets. FIG. 9A shows a mapping between different layers for three different access bearers when the physical layer is an IP layer; FIG. 9B shows a mapping between different layers for three different access bearers when the physical layer is an AAL2/ATM layer. In FIG. 9A and FIG. 9B, the three different access bearers are illustrated in column format. For example, in FIG. 9A in the Link Control (CC) sublayer a first access bearer has RCL PDU $301_{LC-94}$; a second access bearer has a RCL PDU $302_{LC-94}$; and, a third access bearer has RCL PDU $303_{LC-94}$.

Every access bearer (AB) or MAC frame has two transport information elements, one for the stationary equipment unit (SEU) 22 and one for the access network controller node (ANCN) 26. The transport information element (UDP/IP address) is sent by the Connection Control (CC) protocol during the Connection Control (CC) connection request and radio bearer set up, as described above.

For example, every access bearer (AB) or MAC frame has two UDP/IP addresses in case of IP transport protocol, i.e., one UDP/IP address for the stationary equipment unit (SEU) 22 and one UDP/IP address for access network controller node (ANCN) 26. Similarly, every access bearer (AB) or MAC frame has two AAL2 CIDs (connection identifiers) in the case of AAL2 transport: one CID toward the stationary equipment unit (SEU) 22 and one CID toward the access network controller node (ANCN) 26.

The MAC header is a bit string, with a length not necessarily a multiple of 8 bits. The MAC protocol could be simplified by reducing its four headers to one header. That is, of the traditional four headers, the TCTF header, the C/T header, and the UE-Id type header are not be used in the simplification, but only the UE-id header is used and has a maximum of 16 bits. Ciphering is off.

In the transport network, i.e., the lowest layer shown in FIG. 9A and FIG. 9B, the MAC frames are encapsulated (as in WCDMA) today into appropriate packets/frames. In particular, the MAC frames are encapsulated into AAL2 CPS frames in case of ATM transport (see FIG. 9B) and into IP packets in case of IP (see FIG. 9A). Thus, the MAC sublayer has to be adapted to interwork with the UDP/IP layer or the AAL2/ATM layer. The person skilled in the art knows how to make these adaptations to the MAC layer.

The access network controller node (ANCN) 26 as described above provides a way for Mobile operators or new operators to participate in a market of stationary equipment units or fixed terminals, e.g., the fixed market. The access network controller node (ANCN) 26 and the stationary equipment unit (SEU) 22 offer cheaper telephony/video telephony and data for the wire-line subscriber. Moreover, the media access network 20 with its access network controller node (ANCN) 26 is also a way for incumbent POTS, ISDN service provider operators to upgrade their fixed access nodes and fixed network infrastructure to provide new multimedia services by using the new access technology.

The access network controller node (ANCN) 26 controls Access Bearer set up and release, between the stationary equipment unit 22 and the core network(s). This provides a common access interface to each home/office, which access interface supports all media types. Moreover, as previously stated, core networks are only examples of the service provider networks, provision of any type of media stream or data service is possible using this solution.

Also described above are apparatus and method for multiplexing of services with different quality requirements on a single connection dynamically by using one technology and one node system. This opens up different opportunities and solutions in the telecom network and in the wire-line access network. For example, the technology described above facilitates one or more of the following:

Providing POTS/video telephony service over ADSL or Ethernet access in a cost effective way. This is due to the fact that the existing POTS/ISDN HW needed in the network is no longer needed and VoIP technology does not need to be developed and installed. Efficiency is achieved in the fixed network since network hardware in access network controller node (ANCN) 26 is only used when it is required for a connection. High bandwidth Packet Access bearers can be offered at the same time as voice/video and other circuit switched services.

Enabling Mobile Phone operators to break into fixed telephony market and offer better services. High bandwidth Packet Access bearers can be offered at the same time as voice and other circuit switched services.

In one of its example embodiments, the access network controller node establishes the multiple access bearers by utilizing a connection control protocol which is a modification of a UTRAN (Universal Mobile Telecommunications Terrestrial Radio Access Network) radio resource control (RRC) protocol. For example, the connection control (CC) protocol utilized by the access network controller node can be a modification of the UTRAN RRC protocol performed by, e.g., removal of physical parameters related to radio resources and addition of information elements which relate to a transport layer for the physical link.

Preferably, in the same embodiment, the access network controller node utilizes a medium access control (MAC) protocol and a link control (LC) protocol which respectively are modifications of a UTRAN MAC protocol and a UTRAN RLC protocol. For example, the link control (LC) protocol utilized by the access network controller node can differ from the UTRAN RLC protocol by at least one of the following: (1) an acknowledge mode is not utilized; and (2) ciphering is not utilized.

It was mentioned above that the stationary equipment unit (SEU) 22 can be a 3GPP terminal which does not have (or does not use) its radio part for access to the media services provided via media access network 20, but which does have a communication termination for potentially participating in services acquired over the fixed location physical link from media access network 20. FIG. 10 shows an example, illustrative embodiment of a stationary equipment unit which can obtain media services, either alternatively or simultaneously, from both media access network 20 and a radio access network. A stationary equipment unit which can obtain services from both a radio access network and media access network 20 is herein termed a hybrid stationary equipment unit (HSEU). Should the hybrid stationary equipment unit (HSEU) move beyond the range of its essentially fixed location physical link (e.g., by being unconnected from a wire comprising the fixed location physical link or traveling out of range of an electromagnetic beam such as an optical link), the hybrid stationary equipment unit (HSEU) cannot acquire media services from media access network 20. On the other hand, by remaining essentially stationary so that it the fixed location physical link remains connected or effective, the hybrid stationary equipment unit (HSEU) can acquire media services from one or both of media access network 20 and the radio access network (without exercising the mobility which is permitted by the radio access network but which is forbidden by the media access network 20).

In FIG. 10, UTRAN is illustrated as an example one of several types of radio access networks from which a hybrid stationary equipment unit (HSEU) can also obtain media services. The person skilled in the art is familiar with UTRAN structure and operation such as that shown in FIG. 10. In FIG. 10, core network service nodes 30(10) connect to a UMTS Terrestrial Radio Access Network (UTRAN) over a radio access network (RAN) interface referred to as the Iu interface. The UTRAN includes one or more radio network controllers (RNCs) 326 and one or more base stations (BS) 328. For sake of simplicity, the UTRAN of FIG. 1 is shown with only one RNC node. Each RNC 26 is connected to one or more base stations (BS) 328. For example, and again for sake of simplicity, one base station node is shown connected to RNC 326. It will be appreciated that plural base stations are typically served by each RNC, and that RNCs need not serve the same number of base stations. Further, those skilled in the art will also appreciate that a base station is sometimes also referred to in the art as a radio base station, a node B, or B-node.

In FIG. 10, hybrid stationary equipment unit (HSEU) 22(10) selectively communicates with one or more cells or one or more base stations (BS) 328 over a radio or air interface 332. Each of the radio interface 332 and the Iu interface are shown by dash-dotted lines in FIG. 10. In particular, hybrid stationary equipment unit (HSEU) 22(10) is provided with a mobile termination unit (MT) 340 which participates in any radio transmission of media services provided through the radio access network.

FIG. 10 further shows that the hybrid stationary equipment unit (HSEU) 22(10) can participate in certain media services provided via the radio access network (e.g., the UTRAN), and at the same time or other time participate in media services provided via media access network 20. For example, FIG. 1 shows by arrow 10-1 that hybrid stationary equipment unit (HSEU) 22(10) is receiving a first media service (a data service) via media access network 20, and by arrow 10-2 that the hybrid stationary equipment unit (HSEU) 22(10) is receiving a second media service (a speech service) via the UTRAN. Bearers for the respective services depicted by arrows 10-1 and 10-2 are set up by the respective conduit networks, the access bearers in media access network 20 being set up and of the nature described herein.

Figure 11:
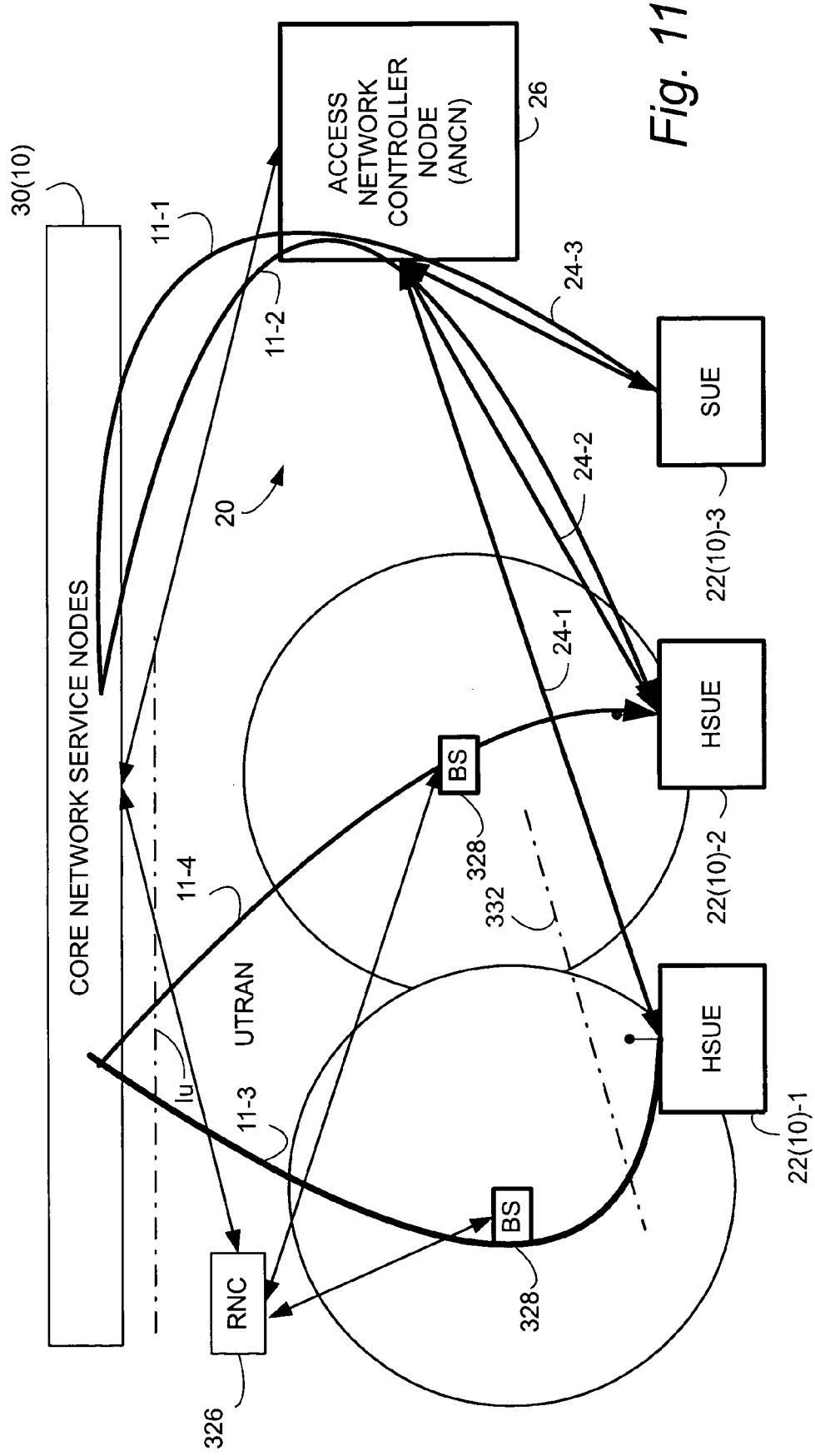
FIG. 11 is a schematic view showing provision of a network capable of transmission of media services across multiple interfaces.

It will be appreciated that, in the situation shown in FIG. 10, the radio access network and the media access network 20 can be operated by the same operator, or by different operators (with the hybrid stationary equipment unit (HSEU) 22(10) having appropriate subscription(s)). In this regard, FIG. 11 shows an example, illustrative embodiment of network operator which provides media services over differing interfaces, e.g., over the radio or air interface 332 on the one hand and over the interface (e.g., fixed location physical link 24, via media access network 20) on the other hand, to one or more hybrid stationary equipment units (HSEU). In the particular example shown in FIG. 11, media access network 20 is providing a first service 11-1 to stationary equipment unit (SEU) 22(10)-3 and a second service 11-2 to hybrid stationary equipment unit (HSEU) 22(10)-2. The UTRAN is being utilized for providing a service 11-3 to hybrid stationary equipment unit (HSEU) 22(10)-1 over the air interface 332 and via one base station, and also for providing a service 11-4 to hybrid stationary equipment unit (HSEU) 22(10)-2 over the air interface 332 and via another base station. It will be appreciated that the UTRAN can utilize one or more base stations for providing services. Moreover, as illustrated in FIG. 10, a stationary equipment unit such as hybrid stationary equipment unit (HSEU) 22(10)-2 can have appropriate terminations for engaging in media services over multiple interfaces (e.g., radio and non-radio), either alternatively or simultaneously.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A node of a communications network comprising:
   plural interfaces connected to respective plural external networks from which the node obtains differing types of media services and provides the differing types of media services to a stationary equipment unit, the plural interfaces including:
   an Iu-CS interface configured for connection toward a circuit switched core mobile network;
   an Iu-PS interface configured for connection toward a packet switched core mobile network;
   a connection control unit configured to use a modified UTRAN signaling protocol for dynamically establishing multiple concurrent access bearers for providing the stationary equipment unit with types of access bearers and services as are provided to a WCDMA user equipment unit, the modified UTRAN signaling protocol being configured to remove physical parameters related to radio resources and to add information elements which relate to a transport layer for the physical link;
   a bearer service processing unit configured to map the multiple concurrent access bearers into packets of a transport protocol of a single essentially fixed location physical link, differing ones of the multiple access bearers being configured for utilization by the differing types of the media services; and
   a port configured to connect the access network controller node to a first endpoint of the fixed location physical link, a second endpoint of the fixed location physical link being connected to the stationary equipment unit.

2. The node of claim 1, wherein the one or more access bearers carry connections for plural services of its associated type of media service.

3. The node of claim 1, wherein the multiple access bearers do not necessarily have a same bandwidth and a same quality of service capabilities.

4. The node of claim 1, wherein the multiple access bearers do not have a same bandwidth and a same quality of service capabilities.

5. The node of claim 1, wherein the multiple concurrent access bearers include both circuit switched access bearers and packet switched access bearers.

6. The node of claim 1, wherein the node establishes access bearers for providing different types of services to the stationary equipment unit, the different types of services including one of voice services, video services, and data traffic services.

7. The node of claim 1, wherein the essentially fixed location physical link is one of the following: (1) a wire line link; (2) an optical link; (3) a radio link of a radio access network which does not involve mobility management.

8. The node of claim 1, wherein the packets of the transport protocol are one of Internet Transport Protocol (IP) packets and Asynchronous Transfer Mode (ATM) packets.

9. The node of claim 1, wherein the multiple concurrent access bearers carry connections for plural services of its associated type of media service.

10. The node of claim 1, wherein the node is further configured to communicate with the stationary equipment unit over a UTRAN (Universal Mobile Telecommunications Terrestrial Radio Access Network) dedicated control channel (DCCH) as if the node were communicating over an air interface with the WCDMA user equipment unit, but with the connection control unit using an information element of the dedicated control channel (DCCH) conventionally used in a UTRAN message for radio resource information for conveying transport channels instead.

11. The node of claim 1, wherein the node is configured to reuse TrCH transport channels information elements of a UTRAN (Universal Mobile Telecommunications Terrestrial Radio Access Network) Connection Control (CC) protocol which otherwise pertain to radio resources for conveying the transport channels.

12. The node of claim 1, wherein the node is radio network controller (RNC) node of a UTRAN (Universal Mobile Telecommunications Terrestrial Radio Access Network) and is configured to use aspects of the UTRAN RLC/MAC and RRC protocols which are common to or borrowed by the CC/MAC (Medium Access Control) and Link Control (CC) protocols of media access network.

13. The node of claim 1, wherein the node is configured to setup the multiple concurrent access bearers using UTRAN (Universal Mobile Telecommunications Terrestrial Radio Access Network) messages in which a traffic descriptor information element has been substituted for a radio resource information element.

14. The node of claim 1, wherein the node is configured to utilize a medium access control (MAC) protocol and a link control (LC) protocol which respectively are modifications of a UTRAN MAC protocol and a UTRAN RLC protocol.

15. The node of claim 1, wherein the node is configured to communicate over the fixed location physical link with the stationary equipment unit being a Third Generation Partnership Project (3GPP) terminal which does not have or does not use its radio part for access to the media services provided through the node.

16. A method of operating a communications network comprising:
   establishing, for an access interface node, plural interfaces connected to respective plural external networks from which the node obtains differing types of media services and provides the differing types of media services to a stationary equipment unit, the plural interfaces including:

an Iu-CS interface configured for connection toward a circuit switched core mobile network;

an Iu-PS interface configured for connection toward a packet switched core mobile network;

connecting the stationary equipment unit to the access interface node by an essentially fixed location physical link;

at the node using a modified UTRAN signaling protocol for dynamically establishing multiple concurrent access bearers for concurrently providing differing types of services offered by one or more external networks through the node and on the multiple concurrent access bearers to the stationary equipment unit on the same essentially fixed location physical link, differing ones of the multiple access bearers being configured for utilization by the differing types of media services, in the modified UTRAN signaling protocol physical parameters related to radio resources have been removed and information elements which relate to a transport layer for the physical link have been added;

mapping the access bearers into packets of a transport protocol of the essentially fixed location physical link.

17. The method of claim 16, further comprising carrying, on at least one of the multiple access bearers, connections for plural services of its associated type of media service.

18. The method of claim 16, further comprising configuring the multiple concurrent access bearers to have different bandwidths and different quality of service capabilities.

19. The method of claim 16, wherein the multiple concurrent access bearers include both circuit switched access bearers and packet switched access bearers.

20. The method of claim 16, further comprising establishing access bearers for providing different types of services to the stationary equipment unit, the different types of services including one of a voice service, a video service, and a data traffic service.

21. The method of claim 16, wherein the essentially fixed location physical link is one of the following: (1) a wire line link; (2) an optical link; (3) a radio link of a radio access network which does not involve mobility management.

22. The method of claim 16, further comprising using as the packets of the transport protocol one of Internet Transport Protocol (IP) packets and Asynchronous Transfer Mode (ATM) packets.

23. The method of claim 16, further comprising the multiple concurrent access bearers carrying connections for plural services of its associated type of media service.

24. The method of claim 16, further comprising the node communicating with the stationary equipment unit over a UTRAN (Universal Mobile Telecommunications Terrestrial Radio Access Network) dedicated control channel (DCCH) as if the node were communicating over an air interface with the WCDMA user equipment unit.

25. The method of claim 16, further comprising the node reusing TrCH transport channels information elements of a UTRAN (Universal Mobile Telecommunications Terrestrial Radio Access Network) Connection Control (CC) protocol which otherwise pertain to radio resources for conveying the transport channels.

26. The method of claim 16, wherein the node is radio network controller (RNC) node of a UTRAN (Universal Mobile Telecommunications Terrestrial Radio Access Network), and wherein the method further comprises the node using aspects of the UTRAN RLC/MAC and RRC protocols which are common to or borrowed by the CC/MAC (Medium Access Control) and Link Control (CC) protocols of media access network.

27. The method of claim 16, further comprising the node setting up the multiple concurrent access bearers using UTRAN (Universal Mobile Telecommunications Terrestrial Radio Access Network) messages in which a traffic descriptor information element has been substituted for a radio resource information element.

28. The method of claim 16, further comprising the node using a medium access control (MAC) protocol and a link control (LC) protocol which respectively are modifications of a UTRAN MAC protocol and a UTRAN RLC protocol.

29. The method of claim 16, further comprising the node communicating over the fixed location physical link with the stationary equipment unit being a Third Generation Partnership Project (3GPP) terminal which does not have or does not use its radio part for access to the media services provided through the node.

* * * * *

UNITED STATES PATENT AND TRADEMARK OFFICE
CERTIFICATE OF CORRECTION

PATENT NO. : 7,623,508 B2
APPLICATION NO. : 10/823764
DATED : November 24, 2009
INVENTOR(S) : Khoury et al.

It is certified that error appears in the above-identified patent and that said Letters Patent is hereby corrected as shown below:

On the Title Page, in Field (75), under "Inventors", in Column 1, Line 2, delete "Lindingo" and insert -- Lidingö --, therefor.

In Column 6, Line 28, delete "(CC)" and insert -- (LC) --, therefor.

In Column 6, Line 30, delete "(CC)" and insert -- (LC) --, therefor.

In Column 6, Line 32, delete "(CC)" and insert -- (LC) --, therefor.

In Column 6, Line 34, after "Link Control", delete "(CC)" and insert -- (LC) --, therefor.

In Column 6, Line 35, delete "(CC)" and insert -- (LC) --, therefor.

In Column 7, Line 1, delete "(CC)" and insert -- (LC) --, therefor.

In Column 8, Line 2, delete "1" and insert -- L1 --, therefor.

In Column 12, Line 63, delete "(CC)" and insert -- (LC) --, therefor.

In Column 14, Line 28, after "Link Control", delete "(CC)" and insert -- (LC) --, therefor.

In Column 17, Line 37, delete "(CC)" and insert -- (LC) --, therefor.

In Column 17, Line 39, delete "(CC)" and insert -- (LC) --, therefor.

In Column 17, Line 49, delete "(CC)" and insert -- (LC) --, therefor.

In Column 17, Line 65, delete "(CC)" and insert -- (LC) --, therefor.

In Column 18, Line 27, delete "(CC)" and insert -- (LC) --, therefor.

Signed and Sealed this

Fourteenth Day of September, 2010

David J. Kappos
*Director of the United States Patent and Trademark Office*

CERTIFICATE OF CORRECTION (continued)
U.S. Pat. No. 7,623,508 B2

In Column 18, Line 28, delete "1" and insert -- L1 --, therefor.

In Column 18, Line 37, delete "(CC)" and insert -- (LC) --, therefor.

In Column 22, Line 45, in Claim 12, delete "(CC)" and insert -- (LC) --, therefor.

In Column 24, Line 26, in Claim 26, delete "(CC)" and insert -- (LC) --, therefor.